(12) United States Patent
Richardson et al.

(10) Patent No.: US 8,827,531 B2
(45) Date of Patent: Sep. 9, 2014

(54) LIGHTING ASSEMBLY

(75) Inventors: Brian E. Richardson, San Jose, CA (US); Timothy A. McCollum, Avon Lake, OH (US); Fumitomo Hide, San Jose, CA (US); Alexey Titov, Sagamore Hills, OH (US); Ian Hardcastle, Sunnyvale, CA (US); Pete E. Pappanastos, Saratoga, CA (US)

(73) Assignee: Rambus Delaware LLC, Brecksville, OH (US)

( * ) Notice: Subject to any disclaimer, the term of this patent is extended or adjusted under 35 U.S.C. 154(b) by 189 days.

(21) Appl. No.: 13/468,399

(22) Filed: May 10, 2012

(65) Prior Publication Data

US 2012/0287668 A1 Nov. 15, 2012

Related U.S. Application Data

(60) Provisional application No. 61/515,530, filed on Aug. 5, 2011, provisional application No. 61/485,836, filed on May 13, 2011.

(51) Int. Cl.
| | | |
|---|---|---|
| *F21S 8/08* | (2006.01) | |
| *F21V 5/02* | (2006.01) | |
| *G02B 6/00* | (2006.01) | |
| *F21V 7/04* | (2006.01) | |
| *F21V 29/00* | (2006.01) | |

(52) U.S. Cl.
CPC . *F21V 7/04* (2013.01); *Y02B 20/72* (2013.01); *F21V 29/00* (2013.01)
USPC ............................ 362/623; 362/555; 362/431

(58) Field of Classification Search
USPC .......... 362/602, 623, 551, 555, 559, 293, 431
See application file for complete search history.

(56) References Cited

U.S. PATENT DOCUMENTS

| | | | |
|---|---|---|---|
| 223,898 A | 1/1880 | Edison | 313/315 |
| 2,673,923 A | 3/1954 | Williams | 240/3.1 |

(Continued)

FOREIGN PATENT DOCUMENTS

| | | | |
|---|---|---|---|
| EP | 0814300 | 12/1997 | F21V 8/00 |
| EP | 0867747 | 9/1998 | G02F 1/1335 |

(Continued)

OTHER PUBLICATIONS

International Search Report and the Written Opinion with mail date of Feb. 7, 2011 re International Application No. PCT/US2010/0001661. 10 pages.

(Continued)

*Primary Examiner* — Peggy Neils
(74) *Attorney, Agent, or Firm* — Renner, Otto, Boisselle & Sklar, LLP

(57) ABSTRACT

A lighting assembly includes a light guide and a light source. The light guide has opposed major surfaces and side surfaces extending between the major surfaces. The light source is at an apex region between two side surfaces and is configured to input light to the light guide. The side surfaces comprise a stepped reflective side surface extending from the apex region and comprising a first reflective step and a second reflective step, and an output side surface extending from the apex region and comprising a first output region and a second output region. The first reflective step is configured to reflect a first portion of input light through the first output region. The second step is configured to reflect a second portion of input light through the second output region. The second output region comprises segments oriented nominally normal to the reflected second portion of the light incident thereon.

52 Claims, 12 Drawing Sheets

(56) References Cited

U.S. PATENT DOCUMENTS

| | | | | |
|---|---|---|---|---|
| 2,971,083 | A | 2/1961 | Phillips et al. ............... | 240/78 |
| 4,172,631 | A | 10/1979 | Yevick ...................... | 350/96.25 |
| 4,392,187 | A | 7/1983 | Bornhorst .................. | 362/233 |
| 4,566,935 | A | 1/1986 | Hornbeck ................... | 156/626 |
| 4,596,992 | A | 6/1986 | Hornbeck ................... | 346/76 |
| 4,615,595 | A | 10/1986 | Hornbeck ................... | 353/122 |
| 4,662,746 | A | 5/1987 | Hornbeck ................... | 350/269 |
| 4,710,732 | A | 12/1987 | Hornbeck ................... | 332/7.51 |
| 4,956,619 | A | 9/1990 | Hornbeck ................... | 330/4.3 |
| 4,972,306 | A | 11/1990 | Bornhorst .................. | 362/278 |
| 5,028,939 | A | 7/1991 | Hornbeck et al. ............ | 346/160 |
| 5,083,252 | A | 1/1992 | McGuire .................... | 362/293 |
| 5,126,886 | A | 6/1992 | Richardson et al. ......... | 359/619 |
| 5,217,285 | A | 6/1993 | Sopori ....................... | 362/1 |
| 5,221,987 | A | 6/1993 | Laughlin .................... | 359/222 |
| 5,319,491 | A | 6/1994 | Selbrede .................... | 359/291 |
| 5,396,350 | A | 3/1995 | Beeson et al. .............. | 359/40 |
| 5,467,208 | A | 11/1995 | Kokawa et al. ............. | 359/49 |
| 5,631,895 | A | 5/1997 | Okada et al. ............... | 369/275.1 |
| 5,825,548 | A | 10/1998 | Bornhort et al. ............ | 359/578 |
| 5,936,772 | A | 8/1999 | Suzuki ....................... | 359/627 |
| 5,953,469 | A | 9/1999 | Zhou .......................... | 385/22 |
| 5,995,690 | A | 11/1999 | Kotz et al. .................. | 385/25 |
| 6,040,937 | A | 3/2000 | Miles .......................... | 359/291 |
| 6,048,081 | A | 4/2000 | Richardson ................. | 362/307 |
| 6,350,041 | B1 | 2/2002 | Tarsa et al. ................. | 362/231 |
| 6,360,033 | B1 | 3/2002 | Lee et al. .................... | 385/18 |
| 6,421,103 | B2 | 7/2002 | Yamaguchi .................. | 349/61 |
| 6,421,104 | B1 | 7/2002 | Richard ...................... | 349/63 |
| 6,438,283 | B1 | 8/2002 | Karaguleff .................. | 385/18 |
| 6,502,961 | B1 | 1/2003 | Richardson ................. | 362/268 |
| 6,565,233 | B1 | 5/2003 | Richardson ................. | 362/293 |
| 6,674,562 | B1 | 1/2004 | Miles .......................... | 359/291 |
| 6,729,734 | B2 | 5/2004 | Childers et al. ............. | 353/122 |
| 6,768,572 | B2 | 7/2004 | Romanovsky ................ | 359/245 |
| 6,771,325 | B1 | 8/2004 | Dewald et al. .............. | 348/743 |
| 6,824,270 | B2 | 11/2004 | Kim et al. .................... | 353/31 |
| 6,867,896 | B2 | 3/2005 | Miles .......................... | 359/290 |
| 6,924,945 | B1 | 8/2005 | Richardson ................. | 359/726 |
| 6,937,791 | B2 * | 8/2005 | Guy ............................. | 385/33 |
| 6,948,840 | B2 * | 9/2005 | Grenda et al. ............... | 362/555 |
| 6,974,232 | B1 | 12/2005 | Richardson ................. | 362/293 |
| 6,991,355 | B1 | 1/2006 | Coushaine et al. ........... | 362/555 |
| 7,080,932 | B2 | 7/2006 | Keuper ....................... | 362/613 |
| 7,123,216 | B1 | 10/2006 | Miles .......................... | 345/54 |
| 7,142,744 | B2 | 11/2006 | Walter et al. ................ | 385/18 |
| 7,144,131 | B2 | 12/2006 | Rains .......................... | 362/231 |
| 7,163,325 | B2 * | 1/2007 | Kojima et al. ............... | 362/540 |
| 7,177,498 | B2 | 2/2007 | Cizek .......................... | 385/31 |
| 7,286,296 | B2 | 10/2007 | Chaves et al. ............... | 359/641 |
| 7,345,824 | B2 | 3/2008 | Lubart et al. ................ | 359/641 |
| 7,380,962 | B2 | 6/2008 | Chaves et al. ............... | 362/293 |
| 7,447,397 | B1 | 11/2008 | Maki et al. .................. | 385/17 |
| 7,499,206 | B1 | 3/2009 | Richardson ................. | 359/574 |
| 8,061,880 | B2 * | 11/2011 | Lambert et al. .............. | 362/511 |
| 8,152,352 | B2 | 4/2012 | Richardson ................. | 362/615 |
| 2002/0031294 | A1 | 3/2002 | Takeda et al. ................ | 385/16 |
| 2002/0044720 | A1 | 4/2002 | Brophy et al. ............... | 385/17 |
| 2002/0105729 | A1 | 8/2002 | Whitehead et al. ........... | 359/222 |
| 2004/0076396 | A1 | 4/2004 | Suga ............................ | 385/146 |
| 2004/0109105 | A1 | 6/2004 | Nagakubo et al. ............ | 349/65 |
| 2005/0018147 | A1 | 1/2005 | Lee et al. .................... | 353/98 |
| 2005/0057731 | A1 | 3/2005 | Lee et al. .................... | 353/94 |
| 2005/0201100 | A1 | 9/2005 | Cassarly et al. .............. | 362/317 |
| 2005/0207177 | A1 | 9/2005 | Guy ............................. | 362/576 |
| 2005/0221473 | A1 | 10/2005 | Dubin et al. ................. | 435/287.2 |
| 2005/0243570 | A1 | 11/2005 | Chaves et al. ............... | 362/551 |
| 2005/0248827 | A1 | 11/2005 | Starkweather et al. ....... | 359/291 |
| 2005/0270796 | A1 | 12/2005 | Ichikawa et al. ............. | 362/559 |
| 2006/0070379 | A1 | 4/2006 | Starkweather et al. ........ | 60/527 |
| 2007/0133224 | A1 | 6/2007 | Parker ......................... | 362/600 |
| 2007/0176887 | A1 | 8/2007 | Uehara et al. ................ | 345/102 |
| 2007/0211487 | A1 | 9/2007 | Sormani ...................... | 362/545 |
| 2008/0170296 | A1 | 7/2008 | Chaves et al. ............... | 359/641 |
| 2008/0247169 | A1 | 10/2008 | Zou et al. .................... | 362/296 |
| 2009/0064993 | A1 | 3/2009 | Ghosh et al. ................. | 126/685 |
| 2009/0116099 | A1 | 5/2009 | Richardson ................. | 359/320 |
| 2009/0262368 | A1 | 10/2009 | Leong et al. ................. | 356/615 |
| 2010/0085773 | A1 | 4/2010 | Richardson ................. | 362/615 |
| 2010/0172138 | A1 | 7/2010 | Richardson ................. | 362/277 |
| 2010/0220492 | A1 | 9/2010 | Richardson ................. | 362/551 |
| 2010/0315802 | A1 | 12/2010 | Richardson ................. | 362/84 |
| 2010/0315836 | A1 | 12/2010 | Richardson ................. | 362/619 |
| 2010/0328748 | A1 | 12/2010 | Richardson ................. | 359/222.1 |
| 2012/0120676 | A1 | 5/2012 | Richardson ................. | 362/555 |

FOREIGN PATENT DOCUMENTS

| | | | |
|---|---|---|---|
| EP | 0969305 | 1/2000 | ............ G02B 26/08 |
| EP | 0969306 | 1/2000 | ............ G02B 26/08 |
| EP | 1215526 A1 | 6/2002 | ............ G02F 1/1335 |
| EP | 1291833 | 3/2003 | ............... G09F 9/00 |
| EP | 2045633 | 4/2009 | ............... G02B 6/00 |
| GB | 663840 | 12/1951 | |
| JP | 2002-229017 | 8/2002 | ............ G02F 1/1335 |
| JP | 2010-123309 | 6/2010 | ............... F21S 2/00 |
| KR | 10-0972840 | 7/2010 | ............... F21V 7/04 |
| WO | WO 2004/068183 A2 | 8/2004 | |
| WO | WO 2007-106020 | 9/2007 | ............... G02B 6/00 |
| WO | WO 2008/060335 A1 | 5/2008 | ............. H01L 33/00 |
| WO | WO 2009-024952 A2 | 2/2009 | ............. H01L 33/00 |

OTHER PUBLICATIONS

International Search Report and the Written Opinion with mail date of Feb. 18, 2011 re International Application No. PCT/US2010/0001673. 11 pages.

International Search Report and the Written Opinion with mail date of Mar. 4, 2011 re International Application No. PCT/US2010/0001674. 13 pages.

PCT International Search Report and the Written Opinion with mail date of Sep. 13, 2010, re International Application No. PCT/US2009/006763. 16 pages.

International Preliminary Report on Patentability dated May 31, 2012 re Int'l Application No. PCT/US10/057273. 7 pages.

International Search Report and Written Opinion dated Nov. 28, 2012 in International Application No. PCT/US2012/037250. 9 pages.

Richardson, Brian E., U.S. Appl. No. 12/319,172, filed Jan. 2, 2009, re Statement of Special Status in Support of Petition to Make Special Under the Green Technology Pilot Program mailed Dec. 22, 2009. 5 pages.

Richardson, Brian, U.S. Appl. No. 12/319,172, filed Jan. 2, 2009, re Decision on Petition to Make Special Under the Green Technology Pilot Program (Denied) mailed Oct. 14, 2010. 2 pages.

Richardson, Brian, U.S. Appl. No. 12/319,172, filed Jan. 2, 2009, re Office Action mailed Oct. 21, 2010. 33 pages.

Richardson, Brian, U.S. Appl. No. 12/319,172, filed Jan. 2, 2009, re Preliminary Amendment mailed Sep. 7, 2010. 7 pages.

Richardson, Brian, U.S. Appl. No. 12/319,172, filed Jan. 2, 2009, re Renewed Petition for Green Tech Pilot Program mailed Sep. 7, 2010. 1 page.

Richardson, Brian, U.S. Appl. No. 12/319,172, filed Jan. 2, 2009, re Response to Office Action of Oct. 21, 2010 mailed Mar. 21, 2011. 9 pages.

Richardson, Brian, U.S. Appl. No. 12/319,172, filed Jan. 2, 2009, re Statement of Special Status in Support on Petition to Make Special Under the Green Technology Pilot Program mailed Oct. 22, 2010. 5 pages.

Richardson, Brian, U.S. Appl. No. 12/319,172, filed Jan. 2, 2009, re Decision on Petition to Make Special Under the Green Technology Pilot Program (Denied) mailed Aug. 27, 2010. 3 pages.

Richardson, Brian, U.S. Appl. No. 12/319,172, filed Jan. 2, 2009, re Decision on Petition to Make Special Under the Green Technology Pilot Program (Dismissed) mailed Feb. 22, 2010. 3 pages.

Richardson, Brian, U.S. Appl. No. 12/319,172, filed Jan. 2, 2009, re Decision on Petition to Make Special Under the Green Technology Pilot Program (Dismissed) mailed Jul. 13, 2010. 3 pages.

Richardson, Brian, U.S. Appl. No. 12/319,172, filed Jan. 2, 2009, re Preliminary Amendment mailed Apr. 12, 2010. 6 pages.

Richardson, Brian, U.S. Appl. No. 12/319,172, filed Jan. 2, 2009, re Preliminary Amendment mailed Aug. 13, 2010. 3 pages.

(56) References Cited

OTHER PUBLICATIONS

Richardson, Brian, U.S. Appl. No. 12/319,172, filed Jan. 2, 2009, re Renewed Petition for Green Tech Pilot Program mailed Aug. 13, 2010. 2 pages.

Richardson, Brian, U.S. Appl. No. 12/319,172, filed Jan. 2, 2009, re Renewed Petition for Green Tech Pilot Program mailed Jun. 10, 2010. 1 page.

* cited by examiner

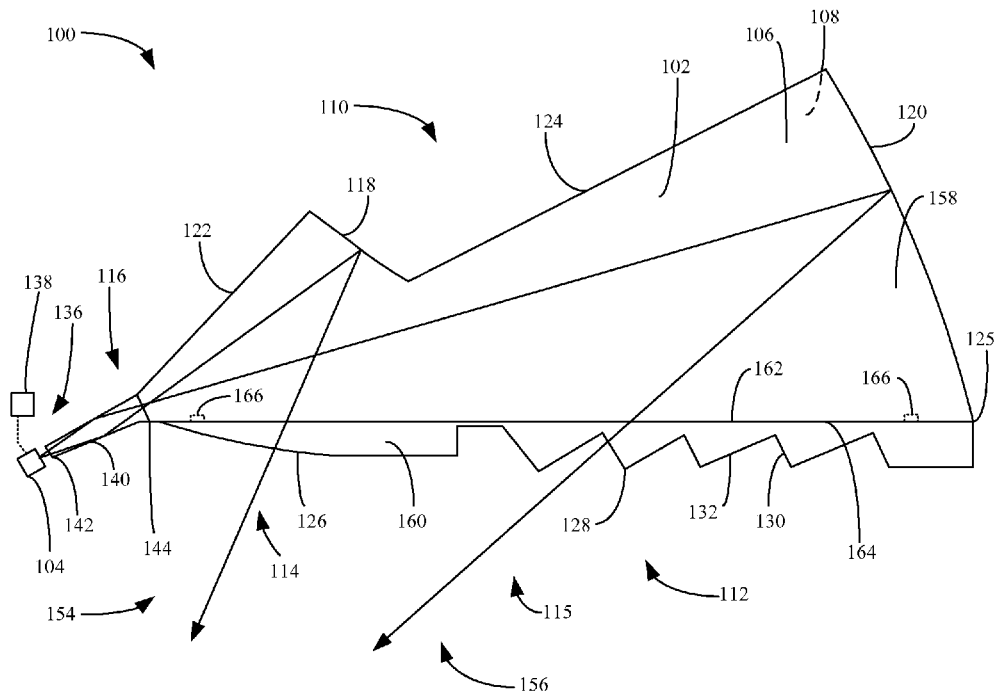

FIG. 13
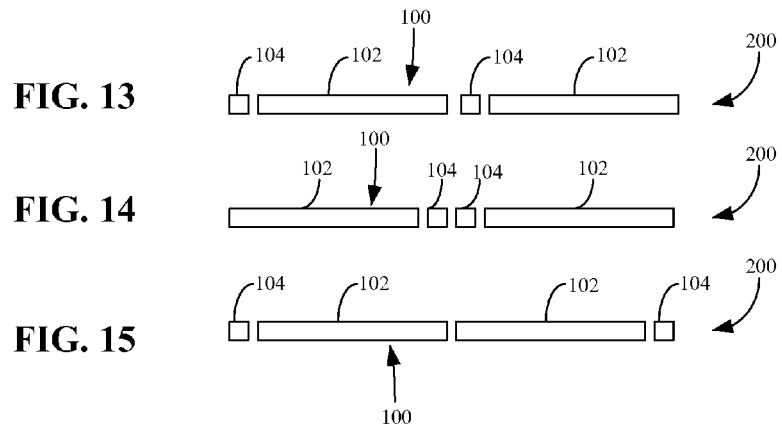
FIG. 14
FIG. 15
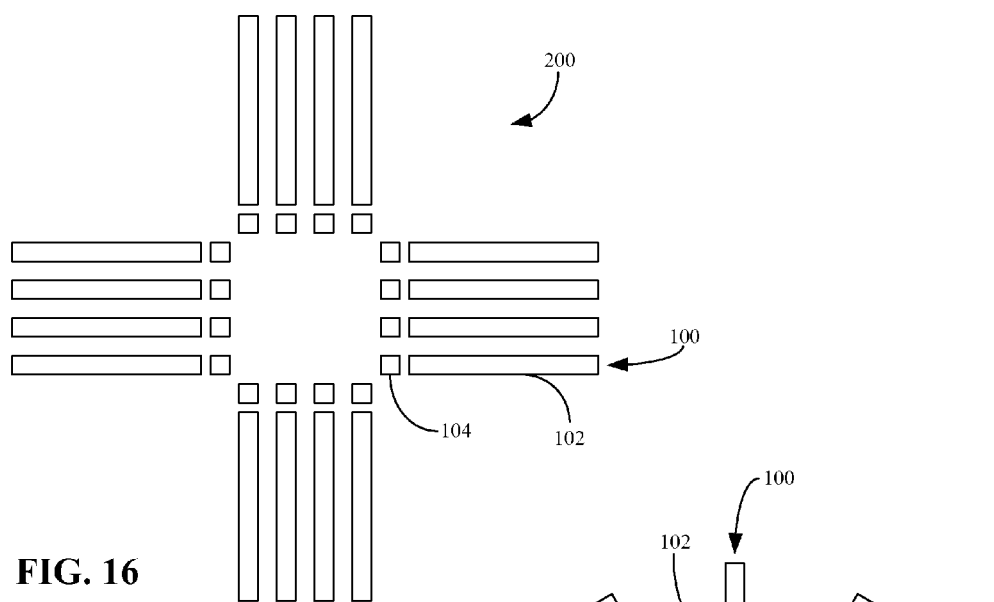
FIG. 16
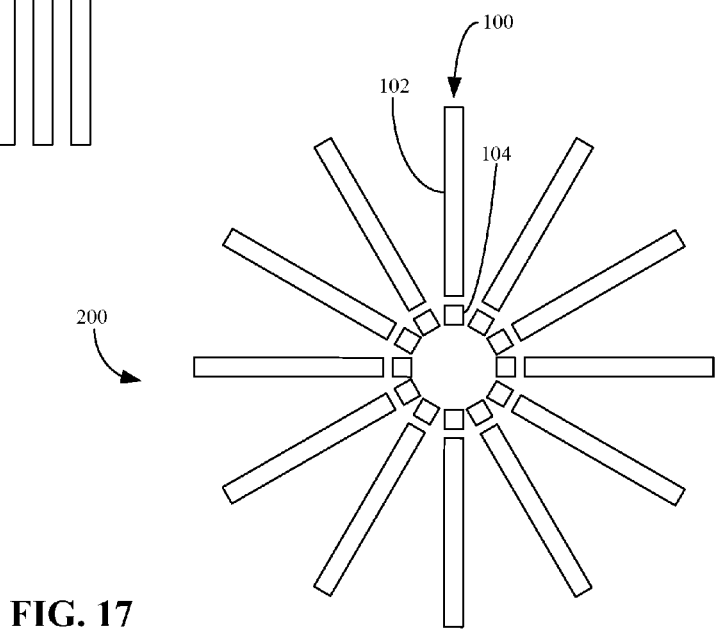
FIG. 17

US 8,827,531 B2

LIGHTING ASSEMBLY

RELATED APPLICATION DATA

This application claims the benefit of U.S. Provisional Patent Application No. 61/485,836, filed May 13, 2011, and claims the benefit of U.S. Provisional Patent Application No. 61/515,530, filed Aug. 5, 2011, the disclosures of which are incorporated herein by reference in their entireties.

BACKGROUND

Energy efficiency has become an area of interest for energy consuming devices. One class of energy consuming devices is lighting assemblies. Light emitting diodes (LEDs) show promise as energy efficient light sources for lighting assemblies. But light output distribution is an issue for lighting assemblies that use LEDs or similar light sources.

BRIEF DESCRIPTION OF THE DRAWINGS

FIGS. 5-9 are schematic views showing parts of other embodiments of a lighting assembly.
FIGS. 10-17 are schematic views showing exemplary lighting fixtures having multiple instances of a lighting assembly.

DESCRIPTION

Figure 1:
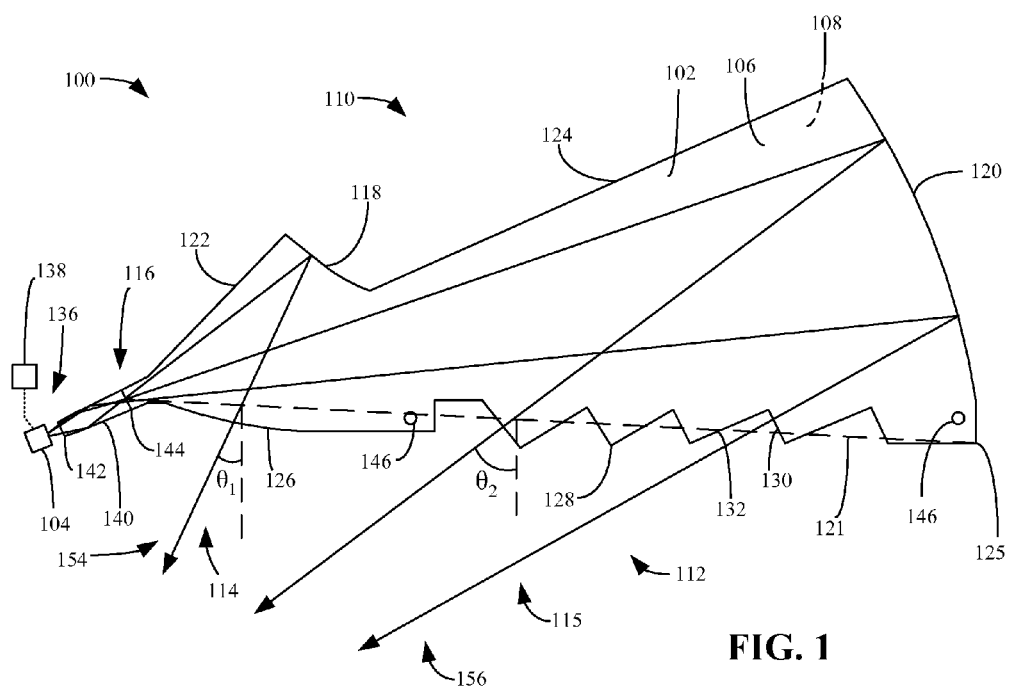
FIGS. 1-4 are schematic views showing parts of an exemplary lighting assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

A lighting assembly includes a light guide and a light source. The light guide has opposed major surfaces between which light propagates by total internal reflection, and side surfaces extending between the major surfaces. The light source is at an apex region between two of the side surfaces of the light guide and is configured to input light to the light guide. The side surfaces comprise a stepped reflective side surface extending from the apex region, and an output side surface extending from the apex region. The stepped reflective side surface comprises a first reflective step closer to the apex region and a second reflective step further from the apex region. The output side surface comprises a first output region closer to the apex region and a second output region further from the apex region. The first reflective step of the stepped reflective side surface is configured to reflect a first portion of the light input to the light guide from the light source through the first output region of the output side surface. The second reflective step of the stepped reflective side surface is configured to reflect a second portion of the light input to the light guide from the light source through the second output region of the output side surface at a larger output angle relative to the output side surface than the light output through the first region of the output side surface. The second output region of the output side surface comprises segments oriented nominally normal to the reflected second portion of the light incident thereon.

Figure 2:
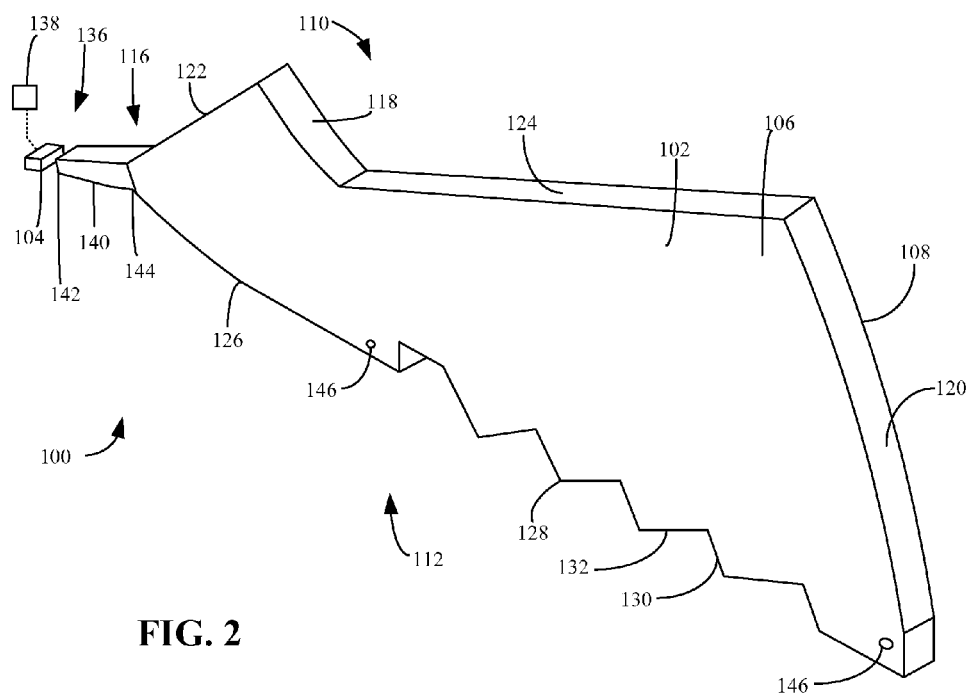

With reference to FIGS. 1 and 2, the lighting assembly 100 includes a light guide 102 and a light source 104. The light guide 102 is a solid article made from a transparent material, for example, acrylic, polycarbonate, poly(methyl-methacrylate) (PMMA), glass, or other appropriate material. The light guide 102 includes a first major surface 106 and a second major surface 108 opposite the first major surface 106. The light guide 102 is configured to propagate light by total internal reflection between the first major surface 106 and the second major surface 108. The light guide 102 may also be referred to as a slab light guide. The length and width dimensions of each of the major surfaces 106, 108 are greater, typically ten or more times greater, than the thickness of the light guide 102. The thickness is the dimension of the light guide 102 in a direction orthogonal to the major surfaces 106, 108.

The light guide 102 includes side surfaces extending between the major surfaces 106, 108 in the thickness direction. Depending on the geometry of the light guide 102, each side surface may be straight or curved, and adjacent side surfaces may meet at a vertex or join in a curve. Moreover, each side surface may include one or more straight portions connected to one or more curved portions.

As illustrated in FIGS. 1 and 2, the light guide 102 includes an output side surface 112 and a stepped reflective side surface 110 that converge towards an apex region 116. In this disclosure, the term apex region is used to describe a region of the light guide where at least two of the side surfaces converge toward each other and at which light from the light source 104 enters the light guide 102. Therefore, depending on the geometry of the light guide 102, the apex region need not include an actual vertex formed by two side surfaces of the light guide 102 and may include one or more intervening side surfaces through which light is input to the light guide 102.

The reflective side surface 110 is a stepped surface that extends from the apex region 116 and includes a first reflective step 118 closer to the apex region 116 and a second reflective step 120 further from the apex region 116. Both of the first reflective step 118 and the second reflective step 120 include a reflective material or coating.

The first reflective step 118 functions as a nominally convex reflector and is configured to reflect a first portion 114 of the light input to the light guide 102 from the light source 104 and incident on the first reflective step 118 toward the output side surface 112. The first reflective step 118 is oriented such that the first portion 114 of the light is incident thereon at a small angle of incidence. Consequently, the first portion 114 of the light is reflected by the first reflective step 118 at a small angle of reflection. In one embodiment, the angle of incidence of the first portion 114 of the light at the first step 118 ranges from 0° to 45° and in any case is less than the critical angle at the first reflective step. The shape and orientation of first reflective step 118 can be optimized using a suitable illumination design program such as LightTools® sold by Synopsis, Inc.

The second reflective step 120 functions as a nominally concave reflector and is configured to reflect a second portion 115 of the light input to the light guide 102 from the light source 104 and incident on the second reflective step 120 toward the output side surface 112. The second reflective step 120 is oriented such that the second portion 115 of the light is incident thereon at a small angle of incidence that is typically less than the angle of incidence of the first portion 114 of the light on the first reflective step 118. Consequently, the second portion 115 of the light is reflected by the second reflective step 120 at a small angle of reflection that is smaller than the angle of reflection of the first portion 114 of the light. In one embodiment, the angle of incidence of the second portion 115 of the light at the second reflective step 120 ranges from 0° to 30° and in any case is less than the critical angle at the second reflective step. The second reflective step 120 is configured to reflect the second portion 115 of the light such that it is output through the output side surface 112 at a larger output angle $\theta_2$ than the output angle $\theta_1$ at which the first portion 114 of the light reflected by the first step 118 is output through the output side surface 112. For determining the output angles relative to the output side surface 112, a mean direction 121 of the output side surface 112 from the apex region 116 to an intersection 125 of the output side surface 112 and the second reflective step 120 is used as a reference. Moreover, references to the direction of the output side surface 112 refer to mean direction 121. The shape and orientation of second reflective step 120 can be optimized using a suitable illumination design program such as LightTools® sold by Synopsis, Inc.

The stepped reflective side surface 110 includes a first adjoining region 122 closer to the apex region 116 and a second adjoining region 124 further from the apex region 116. The first adjoining region 122 extends from the apex region 116 to the first reflective step 118 of the reflective side surface 110. The second adjoining region 124 extends from the first step 118 to the second step 120 of the reflective side surface 110. The first adjoining region 122 and second adjoining region 124 are oriented relative to the light source 104 such that no operably-effective intensity of light is transmitted therethrough. Any light incident on adjoining regions 122, 124 is totally internally reflected towards the respective adjacent reflective step 118, 120.

The output side surface 112 extends from the apex region 116 and includes a first output region 126 closer to the apex region 116 and a second output region 128 further from the apex region 116. The first output region 126 is oriented such that the first portion 114 of the light that is reflected by the first reflective step 118 is directed toward and output through the first output region 126. The first output region 126 is generally arcuate in shape to minimize the angle of incidence of the reflected first portion 114 of the light incident thereon. In some embodiments, the first output region 126 is planar (i.e., the first output region 126 is not curved), and is oriented such that the reflected first portion 114 of the light is incident on the first output region 126 at an angle of incidence less than the critical angle for total internal reflection. In other embodiments, the first output region 126 is generally serrate in shape and includes segments oriented nominally normal to the reflected first portion 114 of the light incident thereon (as exemplified in the embodiment of FIG. 9, described below).

The first portion 114 of the light incident on the first output region 126 is output from the light guide 102 at a predetermined light ray angle distribution 154 in a direction away from the first output region 126. In this disclosure, the term light ray angle distribution is used to describe the variation of the intensity of light with ray angle (typically a solid angle) over a defined range of light ray angles. In some embodiments, the light ray angle distribution 154 of the first portion 114 of the light includes a vector component directed toward the apex region 116.

The second output region 128 is generally serrate in shape and includes segments 130 oriented nominally normal to the reflected second portion 115 of the light incident thereon. The second output region 128 may include any suitable number of segments 130, and the size of the segments 130 may be any suitable size. The segments 130 are separated by side surface sections 132 typically through which no operably-effective intensity of light is transmitted. The second portion 115 of the light input to the light guide 102 is output from the light guide 102 at a predetermined light ray angle distribution 156 in a direction away from the second output region 128 and with a vector component directed toward the apex region 116.

In some embodiments, one or more light redirecting optical elements (not shown) are at at least one of the output regions of the output side surface 112. A light redirecting optical element that is in or on the output side surface will be referred to as being "at" the output side surface. Light guides having such light redirecting optical elements are typically formed by a process such as stamping, molding, embossing, extruding, laser etching, chemical etching, or another suitable process. The light redirecting optical element has light redirecting properties that predictably modify the light ray angle distribution of the light output through the output side surface 112.

Exemplary light redirecting optical elements include features of well defined shape, such as V-grooves, lenticular grooves, and features of well-defined shape that are small relative to the linear dimensions of the primary surface at which they are located, which are sometimes referred to as micro-optical elements. In the case of the second output region 128, the primary surface is the surface of each segment 130. The smaller of the length and width of a micro-optical element is less than one-half of the longer of the length and width of the primary surface and the larger of the length and width of the micro-optical element is less than the smaller of the length and width of the primary surface. The length and width of the micro-optical element is measured in a plane parallel to the primary surface of the light guide 102 for a planar primary surface or along a surface contour for a non-flat primary surface.

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, are not described in detail in this disclosure.

Figure 3:
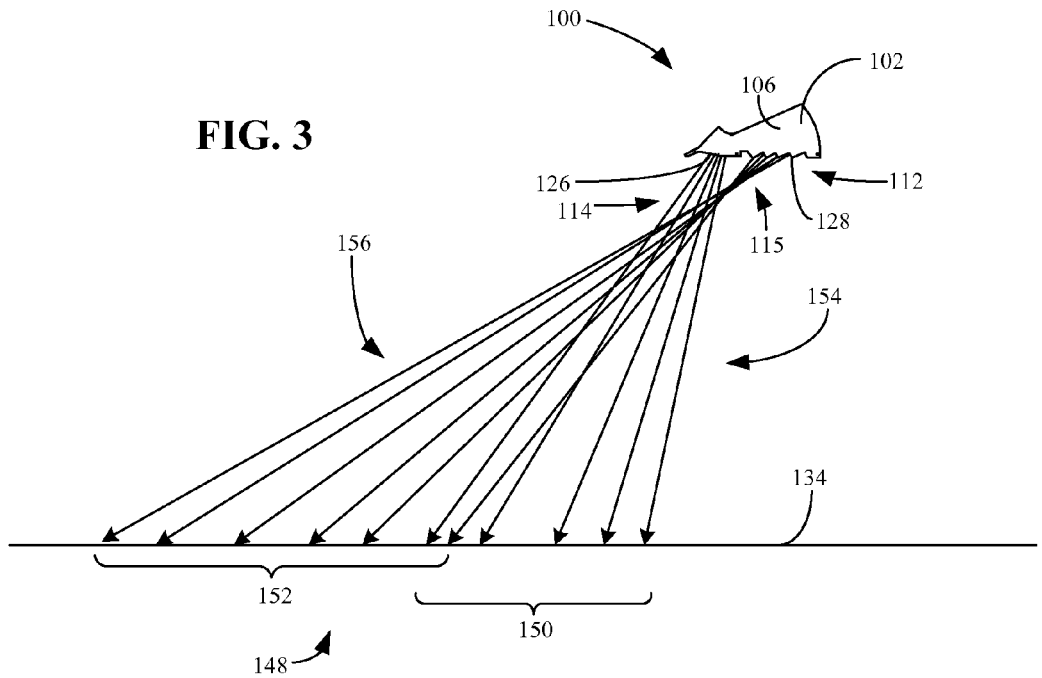
Figure 4:
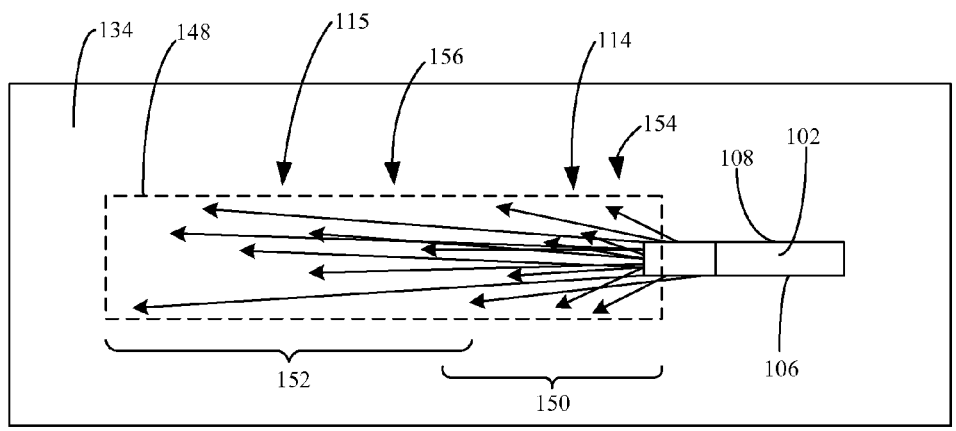

In an example, the first output region 126 includes at least one of a prismatic element, lenticular element, and micro-optical elements oriented non-orthogonally (typically parallel) to the intersection of the first output region 126 and one of the major surfaces 106, 108 and configured to modify the light ray angle distribution 154 of the light output therethrough in a direction orthogonal to the major surfaces. With additional reference to FIGS. 3 and 4, the lighting assembly is configured to illuminate an elongate region 148 of a target surface 134 located opposite the output side surface 112 of the light guide 102. The region 148 is elongate in a direction parallel to the major surfaces 106, 108 (as shown in FIG. 3). The light 114, 115 output from the first output region 126 spreads laterally in a direction orthogonal to the major surfaces 106, 108 (as shown in FIG. 4). However, the first portion 114 of the light typically spreads laterally less than the second portion 115 of the light output through the second output region 128, as a region 150 of the target surface 134 on which the first portion 114 of the light is incident is typically closer to the lighting assembly 100 than a region 152 of the target surface 134 on which the second portion 115 of the light is incident. The optical elements at the first output region 126 modify the light ray angle distribution 154 of the first portion 114 of the light such that the lateral spreading of the respective first and second portions 114, 115 of the light in the direction orthogonal to the major surfaces 106, 108 is similar at the target surface 134.

In another example, the second output region 128 includes a planar surface comprising micro-optical elements in place of the arrangement of segments 130 and sections 132. The micro-optical elements at the second output region 128 are configured to transmit the second portion 115 of the light incident thereon with the predetermined light ray angle distribution 156, and may be referred to as micro segments. In some embodiments, the micro segments do not redirect the light incident thereon, whereas in other embodiments the micro segments redirect the light incident thereon laterally and/or longitudinally to define the light ray angle distribution 156.

In other embodiments, one or more optical adjusters (not shown) are located adjacent at least one of the output regions of the output side surface 112 to modify at least one of spectrum, polarization, intensity, and light ray angle distribution of the light extracted through the output side surface 112.

In an example, a filter that attenuates blue light is located adjacent the first output region 126. The material of some embodiments of the light guide 102 tends to absorb blue light, and as a result, light traveling a longer distance in the light guide 102 (i.e., the light that is reflected by the second reflective step 120 and output through the second output region 128) is output from the light guide 102 with a different spectrum than the light output from the light guide 102 that travels a shorter distance (i.e., the light that is reflected by the first reflective step 118 and output through the first output region 126). The filter adjacent the first output region 126 attenuates blue light to more closely match the spectrum of the first portion 114 of the light output through the first output region 126 to the spectrum of the second portion 115 of the light output through the second output region 128. In another example, the filter is incorporated into the reflective coating at the first reflective step 118: a reflective coating is used that has a reflection characteristic that attenuates blue light to more closely match the spectrum of the first portion 114 of the light output through the first output region 126 to the spectrum of the second portion 115 of the light output through the second output region 128.

Referring again to FIGS. 1 and 2, a light source assembly 136 is located adjacent the apex region 116 and includes the light source 104 that is selectively operable to edge light the light guide 102. The light source 104 is typically embodied as one or more solid-state devices. Exemplary light sources include such solid state devices as light-emitting diodes (LEDs), laser diodes, and organic LEDs (OLEDs). In an embodiment where the light source 104 includes one or more LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light) or a mixture of broad-spectrum LEDs and LEDs that emit monochromatic light of a desired color. In one embodiment, the light source 104 emits light with no operably-effective intensity at wavelengths greater than 500 nanometers (nm) (i.e., the light source 104 emits light at wavelengths that are predominantly less than 500 nm). In such embodiments, phosphors (not shown) convert at least part of the light emitted by the light source 104 to longer-wavelength visible light so that the light guide 102 can be regarded as being edge lit with visible light. In one embodiment, the light source 104 comprises a first LED and a second LED, in which the first and second LEDs have different spectra. The first and second LEDs may be selectively operable. In an example, the first LED is a white LED and the second LED is a red LED. During normal operation, only the first LED is turned on. In an emergency situation, the first LED is turned off and the second LED is turned on.

The light source assembly 136 may additionally include components for controlling and driving the light source 104. In one example, controller 138 is configured to control the illumination state of the light source 104 (i.e., whether the light source 104 emits or does not emit light). In some embodiments, the controller 138 is further configured to adjustably control the light source 104 to increase or decrease the intensity of light emitted by the light source 104 (e.g., dim or brighten the light source 104). The controller 138 may control the light source 104 in accordance with a user input from, for example, a switch (not shown), a knob (not shown), a dial (not shown), a touch screen (not shown), or another suitable device, and/or an input from, for example, one or more sensors (not shown), a remote device (not shown), or an external controller (not shown).

A concentrator 140 is located between the light source 104 and the apex region 116 of the light guide 102. A first end 142 of the concentrator 140 is juxtaposed with the light source 104 and the second end 144 of the concentrator 140 is adjacent the apex region 116. In some embodiments, the concentrator 140 is integrally formed with the light guide 102. In other embodiments, the second end 144 of the concentrator 140 is optically bonded to the apex region 116. The concentrator 140 is configured such that the light ray angle distribution of the light input into the light guide 102 via the concentrator 140 is narrower than that of the light emitted by the light source 140. Specifically, the light ray angle distribution of the light emitted by the light source 104 is narrowed as the light enters the first end 142 of the concentrator 140 due to refraction of the light at the first end 142. Additionally, the concentrator 140 is shaped to narrow the light ray angle distribution of the light as the light propagates from the first end 142 to the second end 144 and is input into the light guide 102. The narrower light ray angle distribution of the light entering the light guide 102 allows the size of the reflective side surface 110 and the overall dimensions of the light guide 102 to be substantially reduced.

The concentrator 140 is oriented relative to the light guide such that the first portion 114 of the light input to the light guide 102 is incident on the first reflective step 118, and the second portion 115 of the light input to the light guide is incident on the second reflective step 120. The orientation of the concentrator 140 determines an apportionment of the light input into the light guide 102 between the first portion 114 of the light incident on the first reflective step 118 and the second portion 115 of the light incident on the second reflective step 120. In one embodiment, more of the light input to the light guide 102 is incident on the second reflective step 120 than on the first reflective step 118. In such an embodiment, the second portion 115 of the light output through the second output region 128 is greater in intensity than the first portion 114 of the light output through the first output region 126.

Although not illustrated in FIGS. 1 and 2, the lighting assembly 100 may also include structural components to retain the light source 104 and the light guide 102. In one embodiment, the light source 104 is mounted to a printed circuit board (PCB). In another embodiment, the light guide 102 is retained by a structural component via one or more through-holes 146 of the light guide 102. In still other embodiments, the lighting assembly 100 additionally includes a housing for retaining the light source assembly 116 and the light guide 102. The housing may retain a heat sink or may itself function as a heat sink. Electrical power is supplied to the lighting assembly 100 through appropriate conductors that pass through the housing. Various exemplary structural components are discussed in more detail below with reference to the exemplary embodiments of a lighting fixture including the lighting assembly 100.

Referring again to FIGS. 3 and 4, the lighting assembly 100 is configured to illuminate the target surface 134, and the reflective side surface 110 of the light guide is configured such that the region 148 of the target surface 134 illuminated by the light output through the output side surface 112 is located generally behind the light source 104 in a direction parallel to the major surfaces 106, 108. That is, the respective light ray angle distributions 154, 156 of the light output through the first and second output regions 126, 128 have directions having a vector component opposite to the general direction in which the light from the light source 104 propagates in concentrator 140.

As illustrated, the respective light ray angle distributions 154, 156 of the portions 114, 115 of the light reflected by the reflective side surface 110 and output through the output side surface 112 typically overlap. Furthermore, the region 150 of the target surface 134 illuminated by the first portion 114 of the light output through the first output region 126 partially overlaps the region 152 illuminated by the second portion 115 of the light output from the second output region 128 to illuminate a contiguous region 148 of the target surface 134. In other embodiments, the reflective side surface 110 is configured such that the light output through the first output region 126 and the light output through the second output region 128 illuminates respective, non-contiguous regions of the target surface 134.

The lighting assembly 100 may be configured to allow the position of the region 148 of the target surface 134 illuminated by the lighting assembly to be adjustable. In one example, the lighting assembly 100 is rotatable about an axis parallel to the major surfaces 106, 108 and to the mean direction 121 of output side surface 112 to laterally vary the location of the region 148 of the target surface 134 illuminated by the light output through the output side surface 112. In another example, the lighting assembly 100 is rotatable about an axis orthogonal to the major surfaces 106, 108 to longitudinally vary the location of the region 148 of the target surface 134 illuminated by the light output through the output side surface 112. Rotation of the lighting assembly 100 may be performed by movement of one or more structural components (not shown) that retain the lighting assembly. For example, a housing that retains the lighting assembly 100 may be pivoted about one or more axes to adjust the position of the illuminated region 148 of the target surface 134. In another example, components within the housing may allow for pivoting of the lighting assembly 100.

FIGS. 5 illustrates another embodiment of the lighting assembly 100 in which the light guide 102 comprises a substrate 158 and an output member 160 optically bonded to the substrate 158. FIG. 6 illustrates the lighting assembly 100 embodiment shown in FIG. 5 with output member 160 removed. The output member 160 includes output side surface 112 remote from a planar side surface 162 of the output member 160. Planar side surface 162 is optically bonded to a planar side surface 164 of the substrate 158. Planar side surface 162 extends from the apex region 116 to intersect with the second reflective step 120. The description of the output side surface 112 set forth above with reference to FIGS. 1 and 2 applies to output side surface 112 of this embodiment. In some implementations, the output member 160 is embodied as a film or molded component optically bonded to the planar side surface 164 of the substrate 158 using an adhesive. In other embodiments, the output member 160 is retained by one or more mechanical fasteners (e.g., threaded fasteners, clips, etc.) and an index matching fluid is interposed between the planar side surfaces 162 and 164. In one example, the substrate 158 and/or output member 160 includes one or more protrusions or detents 166 to align and/or secure the output member 160 to the substrate 158. The output member 160 may be interchangeable with another output member 160 depending on the application. Other types of securing members are possible, and may be in the form of permanent fasteners or in the form of reusable fasteners.

The planar side surface 164 of the substrate 158 is specularly transmissive. Light reflected by the reflective side surface 110 and incident on the planar side surface 164 exits the substrate 158 through the planar side surface 164, enters the output member 160 through the planar side surface 162, and is output through the output side surface 112.

In some embodiments, the substrate 158 and the output member 160 are made from the same material. In other embodiments, the substrate 158 and the output member 160 are made from different materials. In an example, the substrate 158 is made from at least one of polycarbonate, acrylic, and PMMA, and the output member 160 is made from glass.

Figure 7:
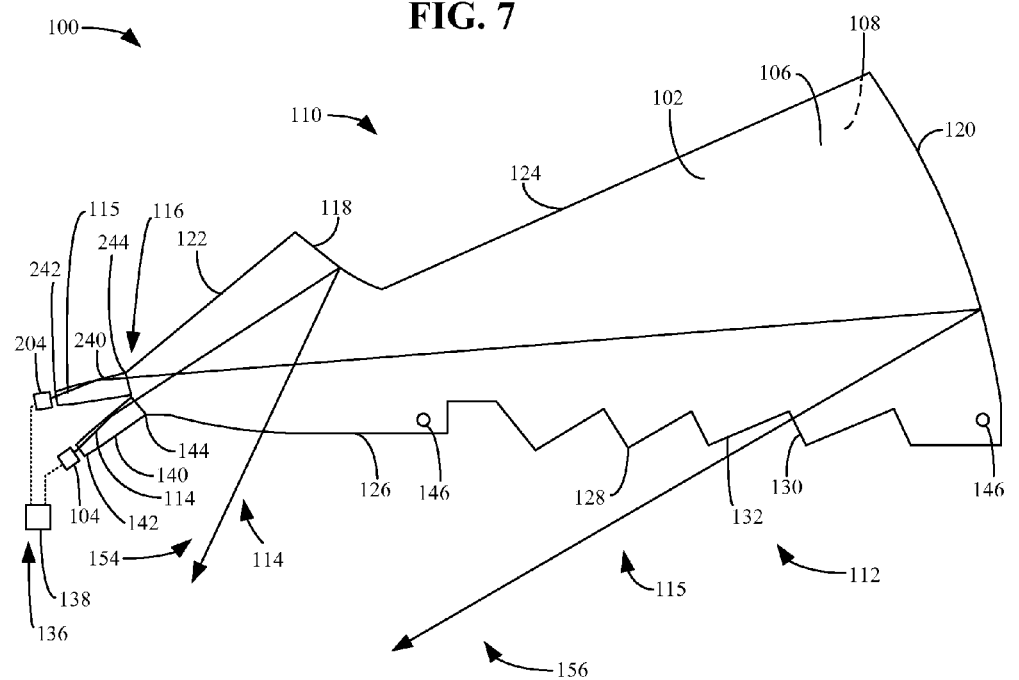
Figure 8:
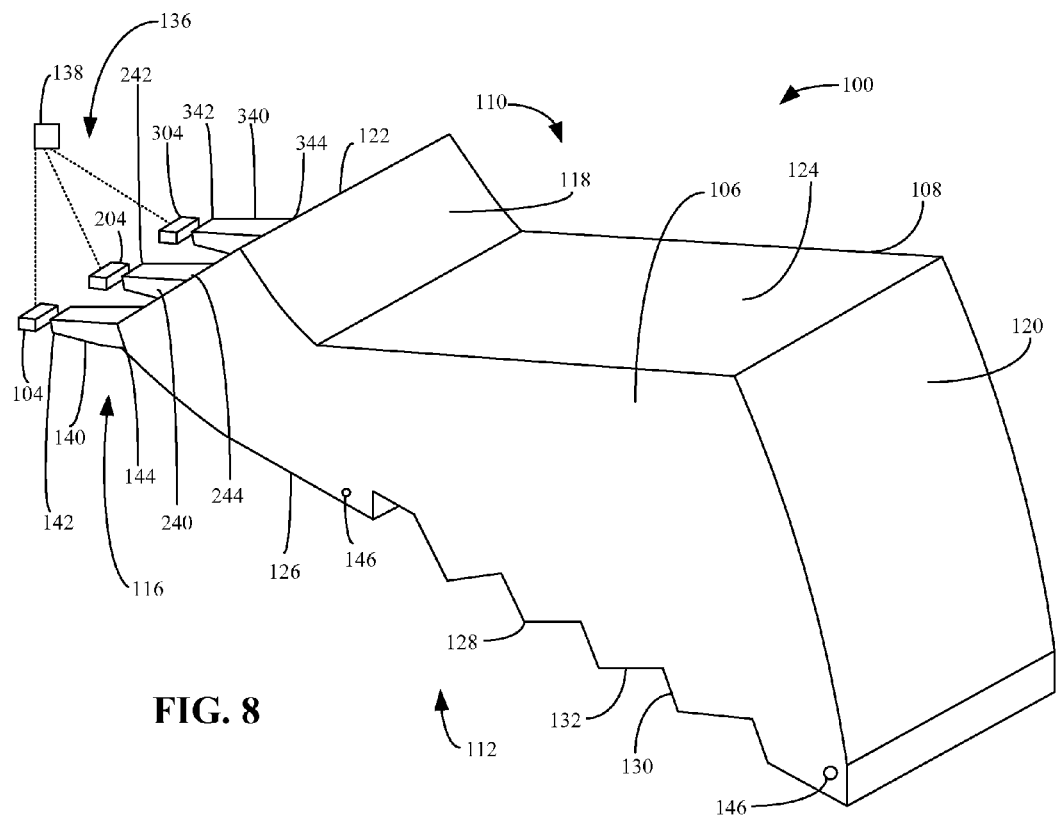

FIGS. 7 and 8 illustrate embodiments in which the lighting assembly 100 includes more than one light source and concentrator.

With reference to FIG. 7, the light source assembly 100 includes concentrators 140, 240 at the apex region 116 of the light guide 102 and arranged to be coplanar with the major surfaces 106, 108 of the light guide 102. Each concentrator 140, 240 is adjacent a respective light source 104, 204. In some embodiments, the light sources 104, 204 have the same nominal spectrum. In other embodiments, light sources 104, 204 have different nominal spectra. In still other embodiments, the light sources 104, 204 have different output intensities. In an example, light source 204 has a higher output intensity to illuminate a greater and/or more distant area.

For each concentrator 140, 240, the light input to the first end 142, 242 propagates along the concentrator 140, 240 and is output from the second end 144, 244 into the light guide 102. Concentrator 140 is oriented relative to the light guide 102 such that its longitudinal axis is directed towards the first reflective step 118, and concentrator 240 is oriented relative to the light guide 102 such that its longitudinal axis is directed towards the second reflective step 120. As a result, a majority of the light 114 input to the light guide 102 by the concentrator 140 is incident on the first reflective step 118, reflected, and output through the first output region 126, and a majority of the light 115 input to the light guide 102 by the concentrator 240 is incident on the second reflective step 120, reflected, and output through the second output region 128. Accordingly, the light 114 input to the light guide 102 from light source 104 is mostly output through the first output region 126 having the light ray angle distribution 154, and the light 115 input to the light guide 102 from light source 204 is mostly output through the second output region 128 having the light ray angle distribution 156.

Controller 138 is configured to control the light sources 104, 204. The controller may selectively control the light sources 104, 204 such that both light sources 104, 204 generate light, neither light source 104, 204 generates light, or only one of the light sources 104, 204 generates light. In some embodiments, the controller 138 is further configured to adjustably control the intensity of the light emitted by one or both of the light sources 104, 204.

With reference to FIG. 8, the light source assembly 100 includes concentrators 140, 240, 340 at the apex region 116 of the light guide 102. Concentrators 140, 240, 340 are arrayed along an axis orthogonal to the major surfaces 106, 108. The thickness of the light guide 102 is greater than the thickness direction in the above-described embodiments. In one implementation, the light guide 102 is formed by extruding the light guide 102 in the thickness direction with a thickness sufficient for a desired number of concentrators to be arrayed in the thickness direction. The example of the lighting assembly 100 shown in FIG. 8 includes three concentrators 140, 240, 340, but the thickness of the light guide 102 in other examples may accommodate more or fewer concentrators.

As illustrated, each concentrator 140, 240, 340 is adjacent a respective light source 104, 204, 304. For each concentrator 140, 240, 340, the light input to the first end 142, 242, 342 from the respective light source 104, 204, 304 propagates along the concentrator 140, 240, 340 and is output from the second end 144, 244, 344 into the light guide 102. In some embodiments, each concentrator 140, 240, 340 is oriented relative to the light guide 102 such that a first portion of the light input to the light guide is incident on the first reflective step 112, and a second portion of the light input to the light guide is incident on the second reflective step 120. In other embodiments, some of the concentrators are oriented relative to the light guide 102 such that a majority of the light input to the light guide 102 therefrom is incident on the first reflective step 118, reflected, and output through the first output region 126, while others of the concentrators are oriented relative to the light guide 102 such that the majority of the light input to the light guide 102 therefrom is incident on the second reflective step 120, reflected, and output through the second output region 128.

Figure 9:
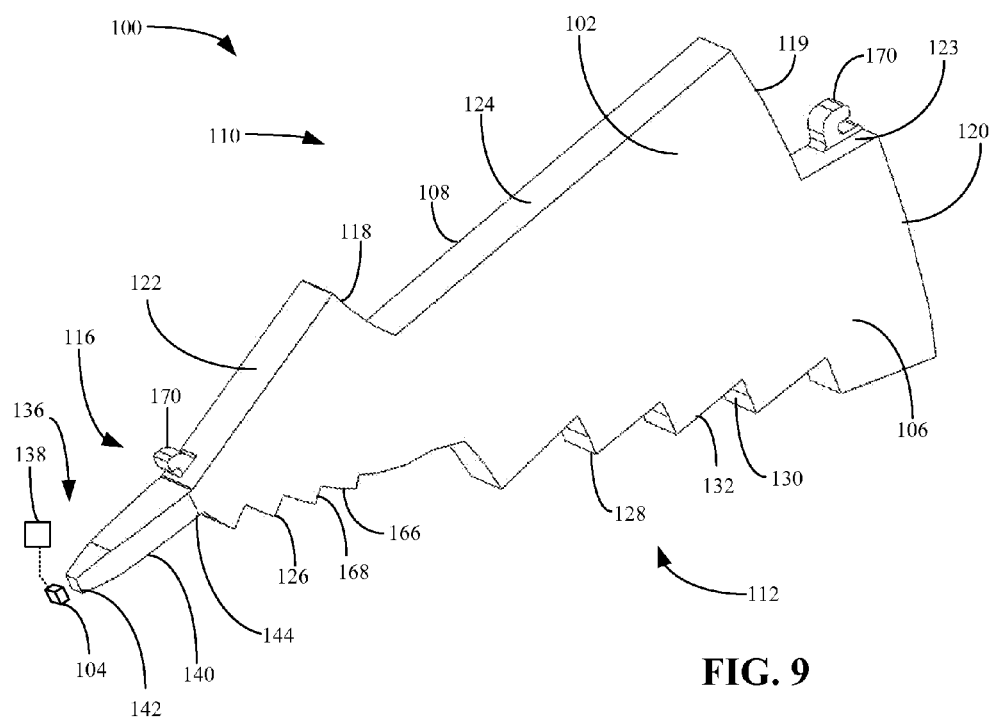

FIG. 9 illustrates an embodiment of the lighting assembly 100 in which the reflective side surface 110 of the light guide 102 has more than two steps. In the example shown, a third reflective step 119 is located between the first reflective step 118 and the second reflective step 120 and a third adjoining region 123 extends from the third reflective step 119 to the second reflective step 120. The third reflective step 119 functions as a concave reflector and is configured to reflect a third portion of the light input to the light guide 102 from the light source 104 toward the second output region 128 of the output side surface 112. The additional reflective step added to the reflective side surface 110 allows the overall size of the light guide 102 to be reduced.

In the embodiment of FIG. 9, the first output region 126 is also generally serrate in shape and includes segments 166 oriented nominally normal to the reflected first portion of the light incident thereon. The first output region 126 may include any suitable number of segments 166, and the size of the segments 166 may be any suitable size. The segments 166 are separated by side surface sections 168 through which typically no operably-effective intensity of light is transmitted. In the example shown, retaining members 170, 171 are respectively located at the first and third adjoining regions 122, 123, and are configured to retain the light guide in a housing (not shown).

The embodiments described above are directed to single a lighting assembly 100. As described below, multiple instances of lighting assembly 100 may be arranged in any suitable manner, and may be included in a lighting fixture. Multiple instances of lighting assembly 100 provide an increase in the overall intensity of emitted light, and also enable light to be selectively output in different directions. FIGS. 10-16 illustrate various exemplary lighting fixtures 200 having multiple instances of lighting assembly 100.

Figure 10:
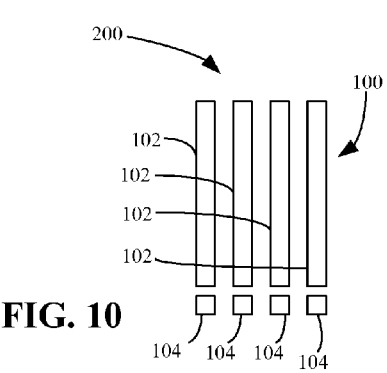
Figure 11:
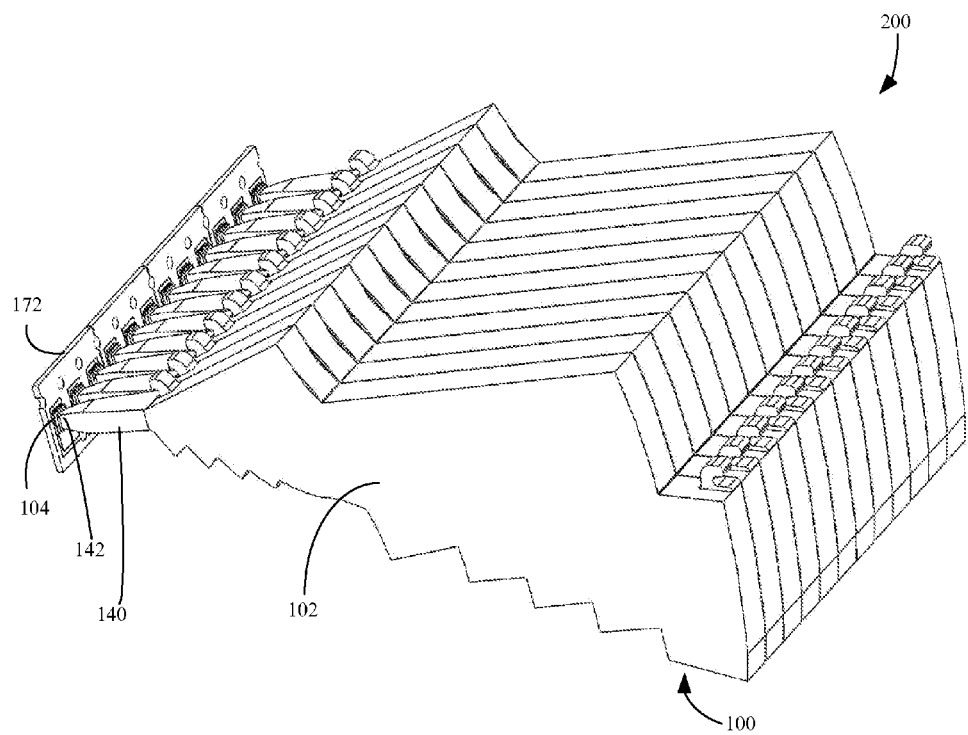
Figure 18:
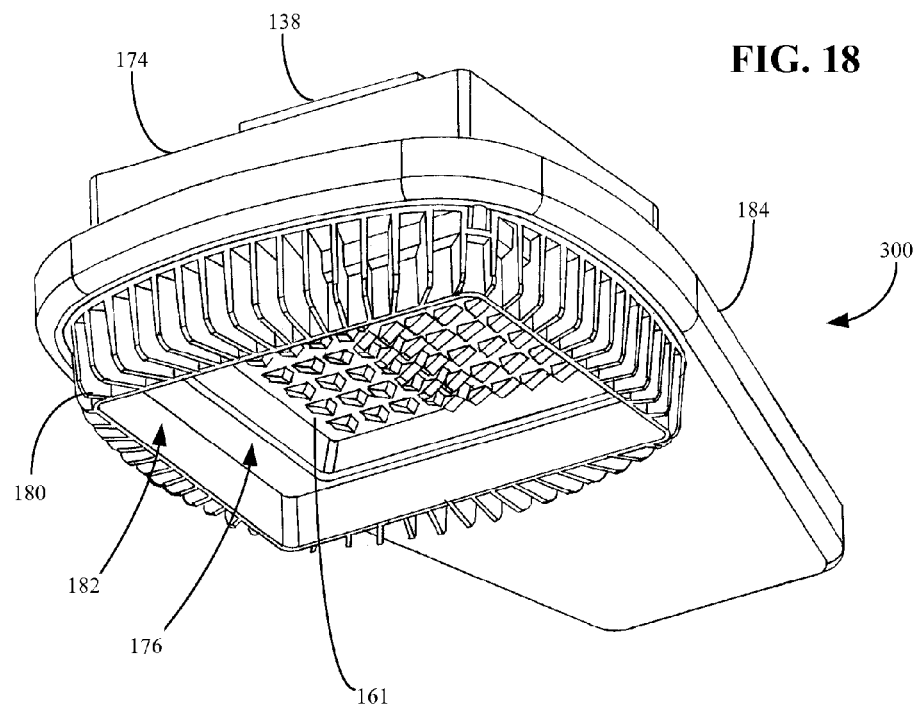
FIGS. 18-22 are schematic views showing parts of an exemplary lighting fixture.
Figure 19:
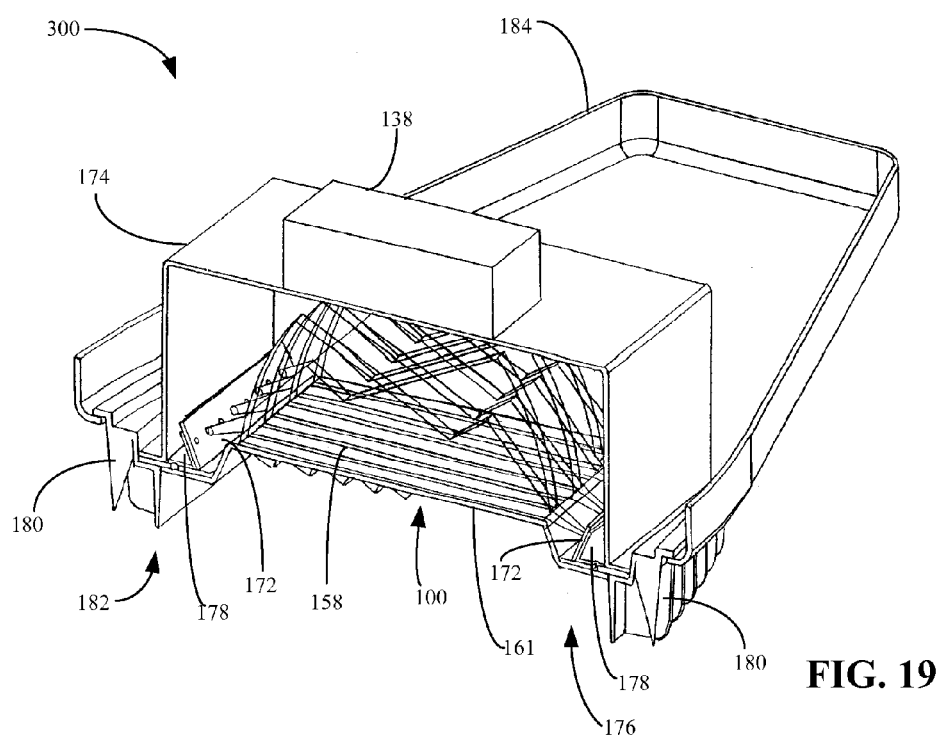
Figure 20:
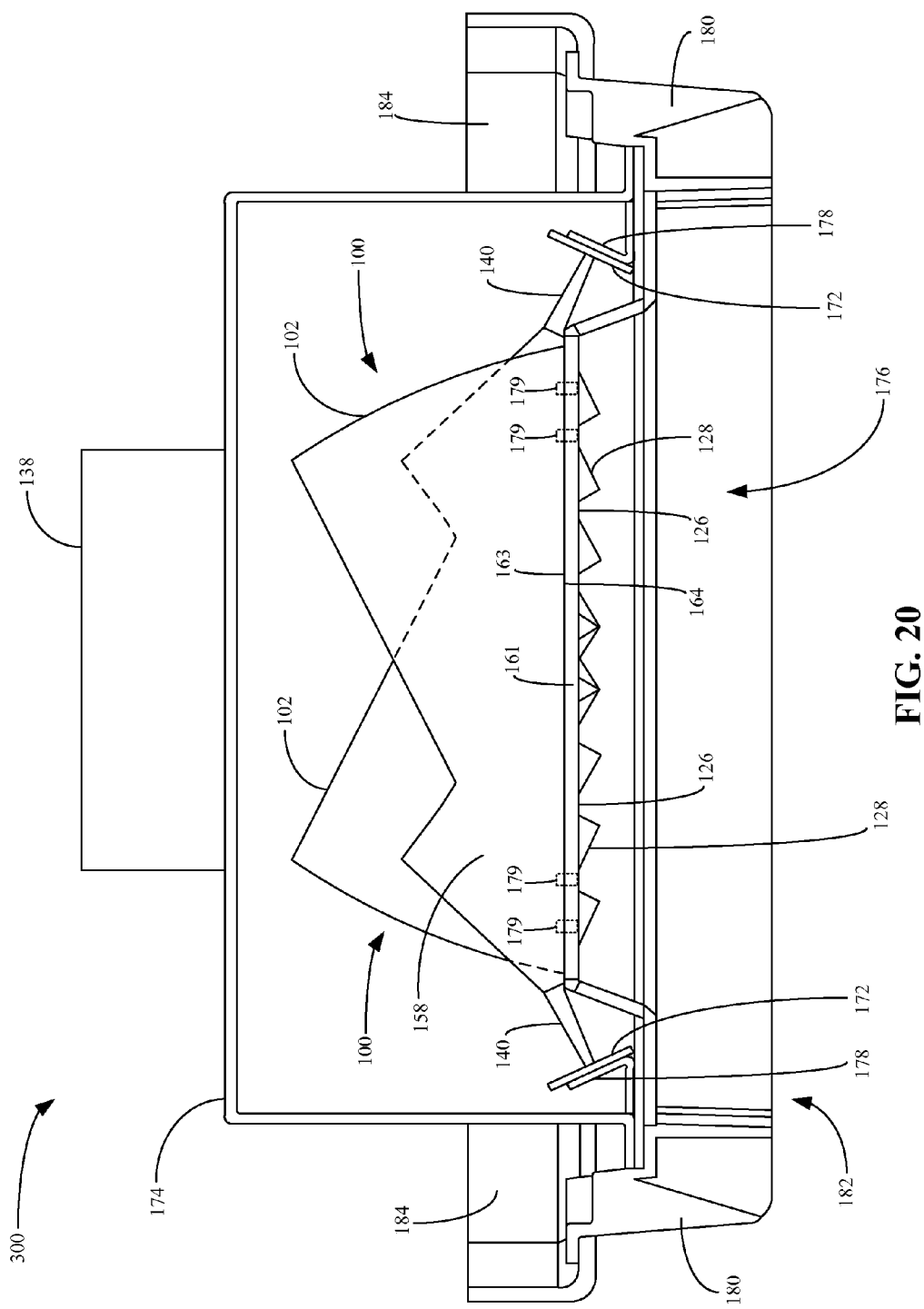

FIG. 10 is a top view of a lighting fixture 200 composed of multiple instances of lighting assembly 100 having the same orientation. FIG. 11 is a perspective view illustrating an exemplary embodiment of the lighting fixture 200 of FIG. 10 in which the lighting assemblies 100 have an arrangement similar to that described above with reference to FIG. 9. Each lighting assembly 100 is oriented in the same direction with each light guide 102 in contact with the respective adjacent light guides. In other embodiments, the light guides 102 are spaced apart from one another by a predetermined distance as shown in FIG. 10. A printed circuit board (PCB) 172 on which light sources 104 are mounted is located adjacent the input ends 142 of the respective concentrators 140 of the lighting assemblies 100. Although not illustrated, the PCB 172 may include an alignment mechanism to align the first end 142 of each concentrator 140 with the respective light source 104. In some embodiments, the PCB 172 includes multiple segments, with a defined number of light sources 104 mounted to each segment. In other embodiments, the PCB 172 is not segmented. The lighting fixture 200 illustrated in FIGS. 10 and 11 outputs light in a single direction relative to the lighting fixture 200 in a manner similar to that shown in FIGS. 3 and 4. The intensity of light emitted from the lighting fixture 200 can be controlled by selectively operating some or all of the lighting assemblies 100.

Figure 12:
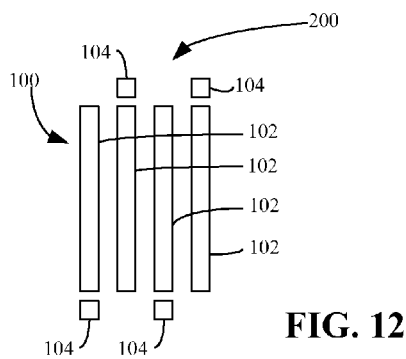

FIG. 12 is a top view of a lighting fixture 200 composed of multiple instances of lighting assembly 100 in which at least one of the lighting assemblies is anti-parallel to the other lighting assemblies. The lighting assemblies 100 are arranged with the respective opposed major surfaces of the light guides 102 facing each other. In the example shown, adjacent ones of the lighting assemblies 100 are anti-parallel to one another. Alternatively, m of the lighting assemblies the same orientation as one another and n of the lighting assemblies have the same orientation as one another, anti-parallel to the orientation of the m of the lighting assemblies. The lighting fixture 200 of FIG. 12 outputs light in two opposed directions relative to the lighting fixture 200. The output of light from the lighting fixture 200 in one or both of the directions, as well as the intensity of the light output from the lighting fixture 200, is controlled by selectively illuminating some or all of the lighting assemblies 100.

FIGS. 13-15 are top views of other arrangements of multiple instances of lighting assembly 100 in respective lighting fixtures 200. In FIG. 13, the lighting assemblies 100 are arranged in tandem and have the same orientation. In FIG. 14, the lighting assemblies 100 are arranged in tandem and are anti-parallel, and the light sources 104 emit light in opposite directions away from each other. In FIG. 15, the lighting assemblies 100 are arranged in tandem and are anti-parallel, and the light sources 104 emit light in opposite directions toward each other.

In other embodiments of the lighting fixture 200, the multiple instances of the lighting assembly 100 are arranged in any suitable shape or pattern. FIG. 16 is a top view of a lighting fixture 200 in which the lighting assemblies 100 are orthogonal to the sides of a square along which they are arranged. FIG. 17 is a top view of a lighting fixture 200 in which the lighting assemblies extend radially from a circle.

In the lighting fixture 200, the lighting assemblies 100 may be retained by one or more structural components.

FIGS. 18-22 illustrate an exemplary embodiment of a lighting fixture 300 that outputs bidirectional light. The lighting fixture 300 includes a housing 174 that retains multiple instances of lighting assembly 100. The housing 174 is open at an end 176 and defines a receptacle in which the lighting assemblies 100 are disposed. In some embodiments, the housing is made of metal, such as aluminum, or other rigid and thermally conductive material.

The housing 174 retains a heat sink 180 that is thermally coupled to the light sources 104. The heat sink 180 follows the periphery of the housing 174 at the open end 176 and defines an opening 182 through which the light output by the lighting assemblies 100 passes. In other embodiments, additional thermal management features may be present. For example, an additional heat sink (not shown) may be thermally coupled to the light sources. Additionally, an active cooling element, such as a fan (not shown) or a heat pipe assembly (not shown) can be included in the lighting fixture 300.

The housing 174 further includes a support member 184 configured to mount the lighting fixture 300 to a retaining structure (e.g., a pole, ceiling, wall, etc.). A cover (not shown) may also be mechanically mounted to the support member 184 to cover the housing 174 and provide a desired aesthetic appearance. Accordingly, the lighting fixture 300 may be embodied as an overhead light (e.g., a street light), a hanging light, a ceiling light (e.g., an assembly to fit in a drop-down ceiling or secure flush to a ceiling), a flood light, or any other illumination device.

In the example shown, adjacent ones of lighting assemblies 100 retained in the housing 174 are anti-parallel to one another in an arrangement similar to that described above with reference to FIG. 12. In another example, m of the lighting assemblies have the same orientation, and n of the lighting assemblies have the same orientation, anti-parallel to the m of the lighting assemblies, also as described above with reference to FIG. 12. The lighting assemblies 100 are recessed in the housing 174 with the respective output side surfaces 112 of the lighting assemblies 100 facing the open end 176 of the housing 174.

Figure 21:
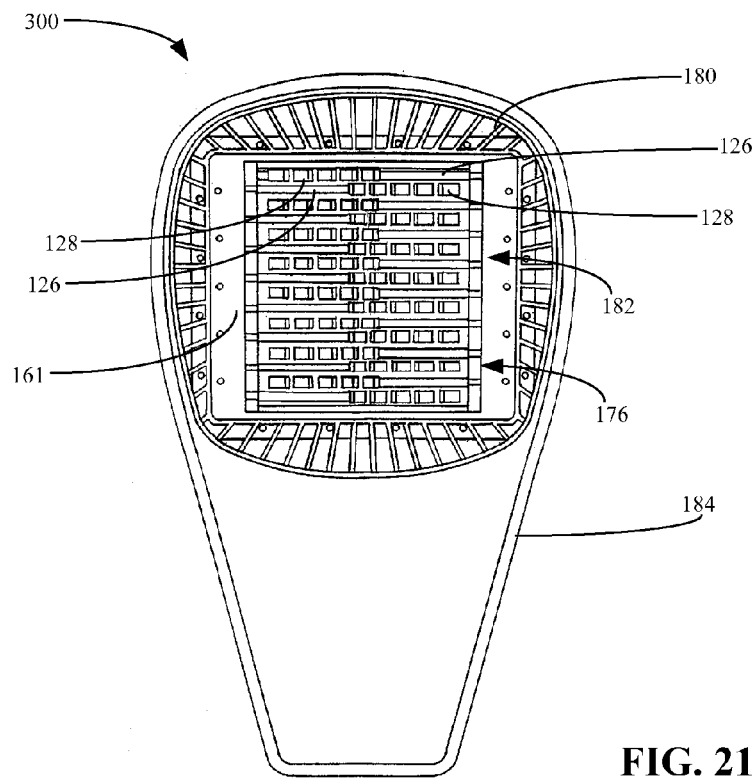
Figure 22:
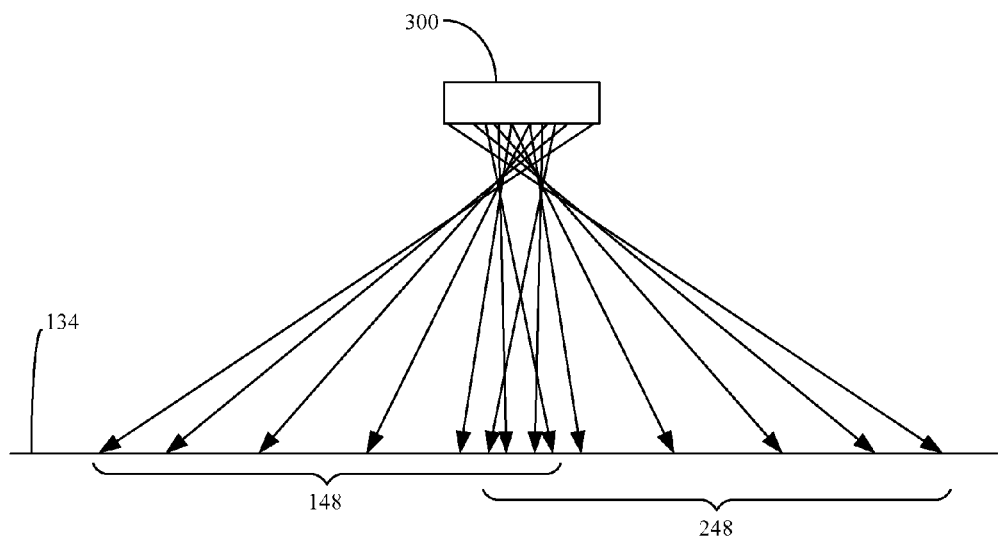

Each lighting assembly 100 includes a substrate 158 that is optically bonded to part of a common output member 161. This embodiment of each lighting assembly 100 is similar to that described above with reference to FIGS. 5 and 6, but in the embodiment shown in FIGS. 18-21, multiple substrates 158 are optically bonded to common output member 161. With specific reference to FIG. 20, the planar side surfaces 164 of the respective substrates 158 are optically bonded to a planar surface 163 of the common output member 161. The common output member 161 includes a respective output side surface 112 for each of the lighting assemblies 100 remote from the planar surface 163. Each substrate 158 is mechanically fastened to the common output member 161 such that the planar side surface 164 of each substrate 158 is aligned with respective first and second output regions 126, 128 of the common output member 161. In the example shown, threaded fasteners 179 mechanically retain the respective substrates 158 to the common output member 161 and an index matching fluid is interposed between the planar side surfaces 164 of the substrates 158 and the planar surface 163 of the common output member 161. FIG. 21 is a bottom view of the lighting fixture 300 that illustrates the alternating arrangement of the first and second output regions 126, 128 included on the common output member 161.

The common output member 161 seals the opening 176 of the housing 174 so that the respective substrates 158 are housed in an enclosed environment within the housing. The common output member 161 is typically made of glass, and the respective substrates 158 are typically made of polycarbonate. Light guides are lower in cost to manufacture from polycarbonate than from glass. However, polycarbonate tends to age and degrade in performance faster than glass when exposed to weathering elements (e.g., sun, rain, etc.). Therefore, sealing the housing using a glass common output member 161 provides improved weatherability, while the lower-cost polycarbonate light guides are housed in a protected environment within the housing. In other embodiments, both the common output member 161 and the substrates 158 are made of the same material (e.g., glass, polycarbonate, acrylic, etc.).

The light sources 104 of the lighting fixture 300 are mounted on respective PCBs 172, and the housing 174 includes armatures 178 for supporting and retaining the respective PCBs 172. The PCBs 172 and armatures 178 are thermally conductive and conduct heat generated by the light sources 104. Furthermore, each light source 104 is located on the PCB 172 such that, when the lighting fixture 300 is assembled, the first end 142 of a respective concentrator 140 is juxtaposed thereto, as shown in FIG. 1. Although not specifically illustrated, the PCB 172 may include alignment mechanisms that align the first end 142 of each concentrator 140 with a respective light source.

Light output from the lighting assemblies 100 passes through the open end 176 of the housing 174 and the opening 182 of the heat sink 180 in two directions opposite one another. With specific reference to FIG. 22, the lighting fixture 300 is configured to output light to illuminate two regions 148, 248 of a target surface 134. Regions 148 and 248 extend longitudinally in opposite directions from the position of lighting fixture 300. Light output from the lighting assemblies 100 that output light in one direction (i.e., towards region 148) illuminates the region 148 of the target surface 134, whereas light output from the lighting assemblies 100 that output light in the opposite direction (i.e., towards region 248) illuminates the region 248 of the target surface 134 adjacent, and typically slightly overlapping, region 148. The positions of regions 148, 248 on the target surface 134 illuminated by the lighting fixture 300 may be adjusted by rotating the lighting fixture 300 or by rotating the lighting assemblies 100 within lighting fixture 300 about one or more axes.

The lighting fixture 300 includes a controller 138 that is configured to selectively control the lighting assemblies 100. The controller 138 may control the light source 104 in accordance with a user input from, for example, a switch (not shown), a knob (not shown), a dial (not shown), a touch screen (not shown) or another suitable device, and/or an input from, for example, one or more sensors (not shown), a timer, (not shown), a remote device (not shown), or an external controller (not shown).

In one example, one or more sensors sense the intensity of ambient light, and the intensity of the light output by the lighting assemblies 100 is controlled in accordance with the intensity of the ambient light. When the intensity of ambient light is greater than a predetermined intensity, the lighting assemblies 100 do not output light. As the intensity of the ambient light decreases progressively below the threshold intensity, a progressively-increasing number of the lighting assemblies 100 are controlled to output light.

In another example, the controller 138 is wirelessly connected (via a transceiver) to a remote control unit (not shown) and the lighting assemblies 100 are controlled remotely via the remote control unit.

Figure 23:
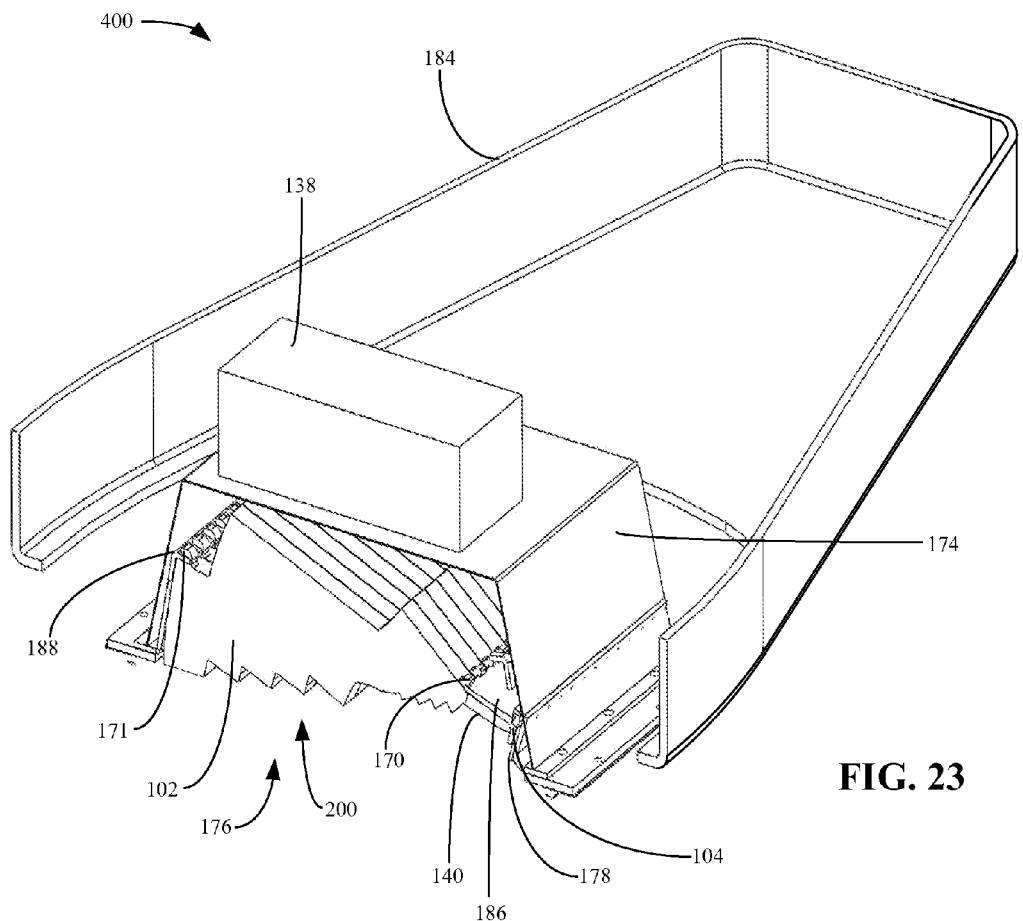
FIGS. 23 and 24 are schematic views showing parts of another embodiment of a lighting fixture.
Figure 24:
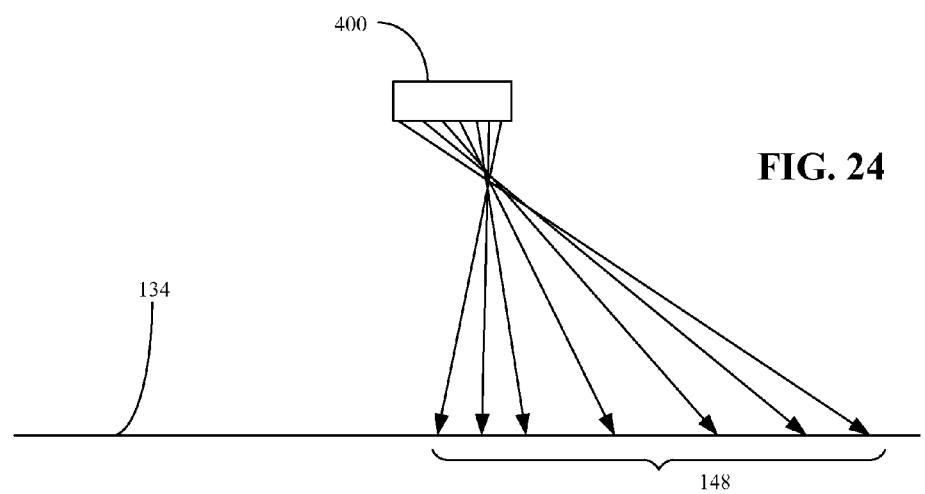

FIGS. 23 and 24 illustrate parts of another exemplary embodiment of a lighting fixture 400 that outputs unidirectional light. For simplicity the heat sink 180 has been omitted from FIG. 23. The lighting fixture 400 differs from the lighting fixture 300 in that the lighting fixture 400 includes a different embodiment of lighting assemblies 100. Specifically, the multiple instances of lighting assembly 100 included in lighting fixture 400 are similar to the lighting assemblies described above with reference to FIGS. 9-11.

The lighting assemblies 100 retained in the housing 174 have the same orientation and are arranged such that the major surfaces of adjacent ones of the lighting assemblies 100 are abutting and the respective output side surfaces 112 of the lighting assemblies 100 are facing the open end 176 of the housing 174.

The housing 174 additionally includes light guide retaining members 186, 188 for retaining the light guides 102 of the respective lighting assemblies 100. The light guide retaining members 186, 188 are configured to engage retaining members 170, 171, respectively, of the light guides 102 and to align the first end of each concentrator 140 with a respective light source 104.

Light output from the lighting assemblies 100 passes through the opening 176 of the housing 174. With specific reference to FIG. 24, the lighting fixture 400 is configured to output light unidirectionally to illuminate a region 148 of a target surface 134. Region 148 extends longitudinally substantially in one direction from the position of lighting fixture 400. The position of region 148 in the target surface 134 illuminated by the lighting fixture 400 may be adjusted by rotating the lighting fixture 400 or by rotating the lighting assemblies 100 within lighting fixture 400 about one or more axes.

Figure 25:
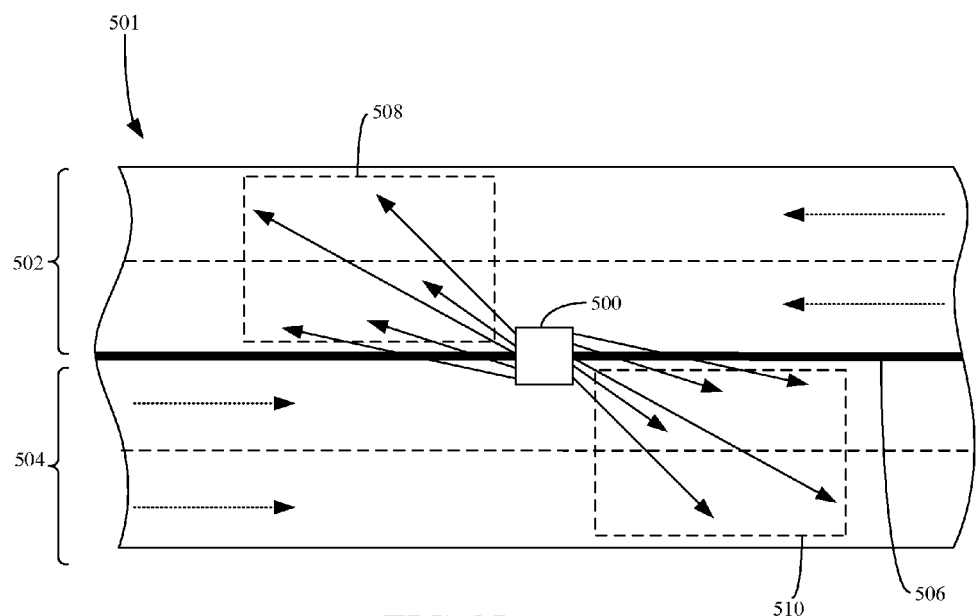
FIGS. 25 and 26 are schematic views of applications of a lighting fixture as a street light.

Lighting fixtures in accordance with the present disclosure are configurable for use in various applications. FIG. 25 illustrates an embodiment of a lighting fixture 500 configured as a street light to illuminate a road 501. The road 501 includes lanes 502, 504 having opposite directions of travel (as indicated by dotted arrows) and separated by a median 506. Lighting fixture 500 is located at an elevated position over the median 506 and is configured such that light output from the lighting assemblies in the lighting fixture 500 to illuminate defined lanes of the road is directed predominantly in the direction of travel in those lanes. In the example shown, the lighting assemblies in lighting fixture 500 that output light to illuminate lanes 502 are each slightly rotated counterclockwise (relative to the direction of the output light) about the mean direction 121 of the output side surface 112 or another suitable axis to move the position of a region 508 laterally outward from the lighting fixture towards the center of lanes 502. Additionally, the lighting assemblies in lighting fixture 500 that output light to illuminate lanes 504 are each slightly rotated counterclockwise (relative to the direction of the output light) about the mean direction 121 of the output side surface 112 or another suitable axis to move the position of region 510 laterally outward from the lighting fixture towards the center of lanes 504. Specifically, the light output by ones of the lighting assemblies in the lighting fixture 500 illuminates a region 508 of the road 501 downstream of the lighting fixture in the direction of travel in lanes 502. Similarly, light output by others of the lighting assemblies in the lighting fixture 500 illuminates a region 510 of the road 501 downstream of the lighting assembly in the direction of travel in lanes 504. The light illuminating each direction of travel emanates from the lighting fixture 500 behind an individual traveling along the road in the direction of travel, and therefore does not impair the vision of such individual.

Figure 26:
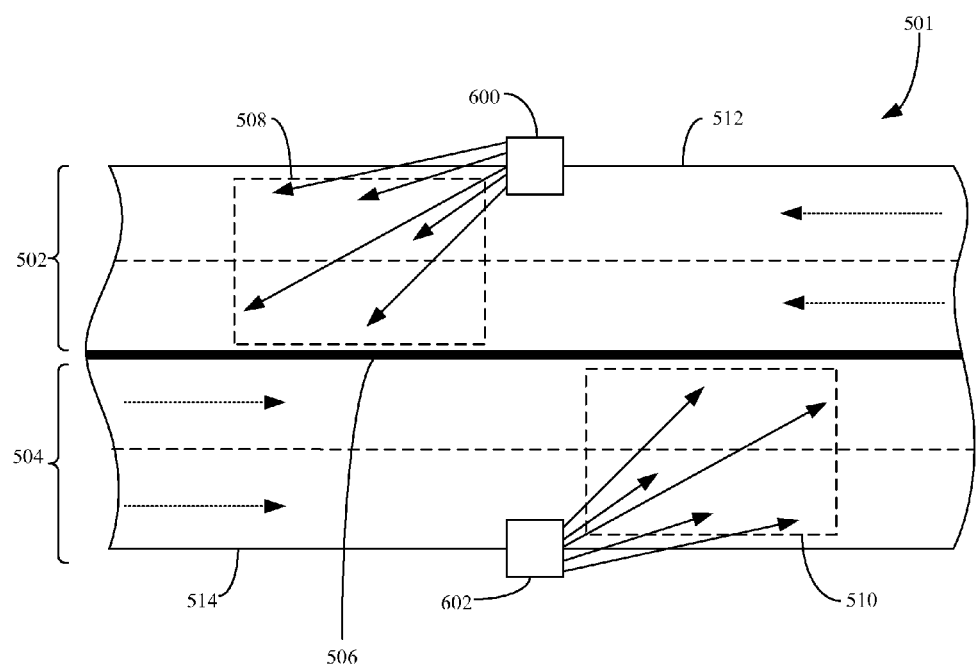

FIG. 26 illustrates another embodiment of a lighting fixture 600, 602 configured as a street light to illuminate the road 501, described above. Lighting fixture 600 is located at an elevated position proximate an edge 512 (e.g., shoulder) of the road 501. Lighting fixture 602 is located at an elevated position proximate the opposite edge 514 (e.g., shoulder) of the road 501. In the example shown, the lighting assemblies in lighting fixture 600 are each slightly rotated clockwise (relative to the direction of the output light) about the mean direction 121 of the output side surface 112 or another suitable axis to move the position of region 508 laterally outward from the lighting fixture towards the center of lanes 502. Additionally, the lighting assemblies in lighting fixture 602 are each slightly rotated clockwise (relative to the direction of the output light) about the mean direction 121 of the output side surface 112 or another suitable axis to move the position of region 510 laterally outward from the lighting fixture towards the center of lanes 504. The light output by the lighting assemblies within lighting fixture 600 illuminates region 508 of the road 501 downstream of lighting fixture 500 in the direction of travel in lanes 502. Similarly, light output by the lighting assemblies within lighting fixture 602 illuminates region 510 of the road 501 downstream of lighting fixture 602 in the direction of travel in lanes 504. The light illuminating each direction of travel emanates from the lighting fixtures 600, 602 behind an individual traveling along the road in the direction of travel, and therefore does not impair the vision of such individual.

Other applications are apparent based on using any of the above-noted embodiments.

In this disclosure, the phrase "one of" followed by a list is intended to mean the elements of the list in the alterative. For example, "one of A, B and C" means A or B or C. The phrase "at least one of" followed by a list is intended to mean one or more of the elements of the list in the alterative. For example, "at least one of A, B and C" means A or B or C or (A and B) or (A and C) or (B and C) or (A and B and C).

What is claimed is:

1. A lighting assembly, comprising:
   a light guide having opposed major surfaces between which light propagates by total internal reflection, and side surfaces extending between the major surfaces; and
   a light source at an apex region between two of the side surfaces of the light guide, the light source configured to input light to the light guide,
   wherein:
      the side surfaces comprise a stepped reflective side surface extending from the apex region, and an output side surface extending from the apex region;
      the stepped reflective side surface comprises a first reflective step closer to the apex region and a second reflective step further from the apex region;
      the output side surface comprises a first output region closer to the apex region and a second output region further from the apex region;
      the first reflective step of the stepped reflective side surface is configured to reflect a first portion of the light input to the light guide from the light source through the first output region of the output side surface;
      the second reflective step of the stepped reflective side surface is configured to reflect a second portion of the light input to the light guide from the light source through the second output region of the output side surface at a larger output angle relative to the output side surface than the light output through the first output region of the output side surface; and
      the second output region of the output side surface comprises segments oriented nominally normal to the reflected second portion of the light incident thereon.

2. The lighting assembly of claim 1, wherein the stepped reflective side surface and the output side surface converge toward the apex region.

3. The lighting assembly of claim 1, further comprising a concentrator between the light source and the apex region of the light guide, wherein the light from the light source propagates along the concentrator before being input into the light guide.

4. The lighting assembly of claim 3, wherein the concentrator is integral with the light guide.

5. The lighting assembly of claim 3, wherein the concentrator is optically bonded to the light guide.

6. The lighting assembly of claim 1, wherein the light source comprises a first light-emitting diode and a second light-emitting diode, the second light-emitting diode having a spectrum different from a spectrum of the first light-emitting diode.

7. The lighting assembly of claim 6, wherein the first light-emitting diode and the second light-emitting diode are selectively operable.

8. The lighting assembly of claim 1, wherein:
the light source comprises a first light-emitting diode and a second light-emitting diode; and
the lighting assembly additionally comprises:
a first concentrator between the first light-emitting diode and the apex region of the light guide, the first concentrator configured to input the first portion of the light to the light guide; and
a second concentrator between the second light-emitting diode and the apex region of the light guide, the second concentrator configured to input the second portion of the light to the light guide.

9. The lighting assembly of claim 8, wherein the first concentrator, the second concentrator and the light guide are coplanar.

10. The lighting assembly of claim 8, wherein
the first concentrator is oriented such that a majority of the light input to the light guide therefrom is incident on the first reflective step of the stepped reflective side surface; and
the second concentrator is oriented such that a majority of the light input to the light guide therefrom is incident on the second reflective step of the stepped reflective side surface.

11. The lighting assembly of claim 10, wherein the second light-emitting diode has a higher output intensity than the first light-emitting diode.

12. The lighting assembly of claim 8, wherein each of the light-emitting diodes is selectively operable.

13. The lighting assembly of claim 1, wherein:
the light source comprises an array of light-emitting diodes; and
the lighting assembly additionally comprises an array of concentrators, each concentrator located between a respective one of the light-emitting diodes and the apex region of the light guide, wherein the light from each of the light-emitting diodes propagates along the respective concentrator before being input into the light guide.

14. The lighting assembly of claim 13, wherein concentrators are arrayed orthogonally to the major surfaces of the light guide.

15. The lighting assembly of claim 13, wherein each of the light-emitting diodes is selectively operable.

16. The lighting assembly of claim 1, wherein the first output region of the output side surface is planar.

17. The lighting assembly of claim 1, wherein the first output region of the output side surface is generally arcuate.

18. The lighting assembly of claim 1, wherein the first output region of the output side surface is generally serrate in shape.

19. The lighting assembly of claim 1, wherein the first output region of the output side surface comprises at least one of a prismatic element, lenticular element, and micro-optical element configured to modify a light ray angle distribution of the light output through the first output region of the output side surface in a lateral direction orthogonal to the major surfaces.

20. The lighting assembly of claim 1, wherein the segments of the second output region of the output side surface are separated by side surface sections through which no operably effective intensity of light is transmitted.

21. The lighting assembly of claim 1, wherein the second output region of the output side surface is planar and the segments of the second output region are micro-segments.

22. The lighting assembly of claim 1, wherein the second output region of the output side surface is generally serrate in shape.

23. The lighting assembly of claim 1, wherein at least one of the output regions of the output side surface comprises micro-optical elements.

24. The lighting assembly of claim 1, wherein the first reflective step of the stepped reflective side surface functions as a nominally convex reflector and is oriented such that the light from the light source is incident thereon at a small angle of incidence.

25. The lighting assembly of claim 1, wherein the second reflective step of the stepped reflective side surface functions as a nominally concave reflector and is oriented such that the light from the light source is incident thereon at a small angle of incidence.

26. The lighting assembly of claim 1, wherein the stepped reflective side surface comprises a reflective coating.

27. The lighting assembly of claim 1, wherein the stepped reflective side surface has more than two reflective steps.

28. The lighting assembly of claim 1, wherein the light guide comprises a substrate and an output member optically bonded to the substrate, the output member comprising at least one of the output regions of the output side surface.

29. The lighting assembly of claim 28, wherein:
the substrate comprises at least one of polycarbonate, acrylic, and poly(methyl-methacrylate); and
the output member comprises glass.

30. The lighting assembly of claim 1, additionally comprising an optical adjuster adjacent at least one of the output regions of the output side surface to modify at least one of spectrum, polarization, and light ray angle distribution.

31. The lighting assembly of claim 1, additionally comprising a filter that attenuates blue light at the first output region to more closely match the spectrum of the light output through the first output region to the spectrum of the light output through the second output region.

32. The lighting assembly of claim 1, additionally comprising a reflective coating at the first reflective step, the reflective coating having a reflection characteristic that attenuates blue light to more closely match the spectrum of the light output through the first output region to the spectrum of the light output through the second output region.

33. The lighting assembly of claim 1, wherein the lighting assembly is configured to illuminate a target surface, and the stepped reflective side surface of the light guide is configured such that a region of the target surface illuminated by the light output through the first output region of the output side surface partially overlaps a region of the target surface illuminated by the light output through the second output region of the output side surface.

34. The lighting assembly of claim 1, wherein the lighting assembly is configured to illuminate a target surface, and the stepped reflective side surface of the light guide is configured such that a region of the target surface illuminated by the light output through the first output region of the output side surface is located behind the light source where a direction of light output by the light source is a forward direction.

35. The lighting assembly of claim 1, wherein the lighting assembly is configured to illuminate a target surface, and the light guide is rotatable about an axis parallel to the output side surface to vary lateral position of a region of the target surface illuminated by the light output through the output side surface.

36. A lighting fixture comprising multiple lighting assemblies, each of the lighting assemblies being a lighting assembly in accordance with claim 1.

37. The lighting fixture of claim 36, wherein the lighting assemblies have the same orientation.

38. The lighting fixture of claim 36, wherein at least one of the lighting assemblies is anti-parallel to others of the lighting assemblies.

39. The lighting fixture of claim 36, wherein at least two of the lighting assemblies are arranged in tandem.

40. The lighting fixture of claim 36, wherein at least two of the lighting assemblies are arranged such that respective opposed major surfaces of the two lighting assemblies face one another.

41. The lighting fixture of claim 36, wherein the lighting assemblies are arranged orthogonal to sides of a square.

42. The lighting fixture of claim 36, wherein the lighting assemblies are arranged to extend radially from a circle.

43. The lighting fixture of claim 36, wherein at least one of the lighting assemblies is rotatable about an axis parallel to the output side surface.

44. The lighting fixture of claim 36, further comprising a controller configured to selectively control illumination of the light sources of the lighting assemblies.

45. The lighting fixture of claim 44, wherein the controller is configured to selectively control the light sources of the lighting assemblies based on ambient light conditions.

46. The lighting fixture of claim 44, wherein the controller is configured to selectively control the light sources of the lighting assemblies in response to remote control.

47. The lighting fixture of claim 36, additionally comprising:
   a housing configured to mechanically retain the lighting assemblies; and
   a heat sink mechanically coupled to the housing and thermally coupled to the light sources of the lighting assemblies.

48. The lighting fixture of claim 47, wherein the housing comprises an armature configured to retain the light source of each of the lighting assemblies.

49. The lighting fixture of claim 47, wherein the heat sink follows at least part of a periphery of the housing.

50. The lighting fixture of claim 47, wherein:
   the heat sink defines an opening; and
   the light output by the lighting assemblies passes through the opening.

51. The lighting fixture of claim 36, wherein the lighting fixture is configured to illuminate at least one lane of a road, the lane having a direction of travel, and the lighting assemblies are arranged such that light is predominantly output from the lighting assemblies in the direction of travel and illuminates a region of the at least one lane.

52. The lighting fixture of claim 36, wherein
   the lighting fixture is configured to illuminate a road, a first side of the road having a first direction of travel, and a second side of the road having a second direction of travel opposed to the first direction of travel;
   ones of the lighting assemblies are arranged such that the light is predominantly output therefrom in the first direction of travel and illuminates a region of the first side of the road having the first direction of travel; and
   others of the lighting assemblies are arranged such that the light is predominantly output therefrom in the second direction of travel and illuminates a region of the second side of the road having the second direction of travel.

* * * * *